United States Patent
Chen et al.

(10) Patent No.: US 11,609,374 B2
(45) Date of Patent: Mar. 21, 2023

(54) DIRECTIONALLY TUNABLE OPTICAL REFLECTOR

(71) Applicant: Taiwan Semiconductor Manufacturing Company, Ltd., Hsinchu (TW)

(72) Inventors: Yu-Hao Chen, HsinChu (TW); Hui Yu Lee, Hsin-Chu (TW); Jui-Feng Kuan, Hsinchu County (TW); Chien-Te Wu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/466,550

(22) Filed: Sep. 3, 2021

(65) Prior Publication Data
US 2022/0299707 A1    Sep. 22, 2022

Related U.S. Application Data

(60) Provisional application No. 63/164,044, filed on Mar. 22, 2021.

(51) Int. Cl.
*G02B 6/12* (2006.01)

(52) U.S. Cl.
CPC .............. *G02B 6/12016* (2013.01); *G02B 2006/12104* (2013.01); *G02B 2006/12138* (2013.01); *G02B 2006/12145* (2013.01)

(58) Field of Classification Search
None
See application file for complete search history.

(56) References Cited

U.S. PATENT DOCUMENTS

| | | | | |
|---|---|---|---|---|
| 4,753,505 A | * | 6/1988 | Mikami | G02F 1/3137 385/5 |
| 5,911,018 A | * | 6/1999 | Bischel | G09F 9/305 385/11 |
| 6,304,362 B1 | * | 10/2001 | Zheludev | G02F 1/0126 359/241 |
| 6,337,760 B1 | * | 1/2002 | Huibers | G02B 6/3518 359/223.1 |

(Continued)

FOREIGN PATENT DOCUMENTS

| | | |
|---|---|---|
| CN | 1705908 A | 12/2005 |
| TW | 200641659 A | 12/2006 |

*Primary Examiner* — Jerry Rahll
(74) *Attorney, Agent, or Firm* — Haynes and Boone, LLP

(57) ABSTRACT

An optical circuit includes one or more input waveguides, a plurality of output waveguides, and a reflector structure. At least a portion of the reflector structure forms an interface with the one or more input waveguides. The portion of the reflector structure has a smaller refractive index than the one or more input waveguides. An electrical circuit is electrically coupled to the optical circuit. The electrical circuit generates and sends different electrical signals to the reflector structure. In response to the reflector structure receiving the different electrical signals, a carrier concentration level at or near the interface or a temperature at or near the interface changes, such that incident radiation received from the one or more input waveguides is tunably reflected by the reflector structure into a targeted output waveguide of the plurality of output waveguides.

20 Claims, 16 Drawing Sheets

(56) References Cited

U.S. PATENT DOCUMENTS

| | | | |
|---|---|---|---|
| 6,356,679 B1 * | 3/2002 | Kapany | G02B 6/29368 |
| | | | 385/48 |
| 8,405,442 B2 | 5/2013 | Chen | |
| 8,436,671 B2 | 5/2013 | Chern et al. | |
| 8,610,488 B2 | 12/2013 | Yu et al. | |
| 8,625,240 B2 | 1/2014 | Chung et al. | |
| 8,716,841 B1 | 5/2014 | Chang et al. | |
| 8,736,084 B2 | 5/2014 | Cheng et al. | |
| 8,837,810 B2 | 9/2014 | Chen et al. | |
| 8,847,659 B1 | 9/2014 | Lan et al. | |
| 10,481,466 B2 * | 11/2019 | Xing | H05B 3/26 |
| 2002/0131712 A1 * | 9/2002 | Markwardt | G02B 6/266 |
| | | | 385/140 |
| 2002/0136482 A1 * | 9/2002 | Zhang | G02F 1/31 |
| | | | 385/16 |
| 2006/0072866 A1 | 4/2006 | Mizuno et al. | |
| 2010/0142884 A1 * | 6/2010 | Han | G02F 1/3137 |
| | | | 385/16 |
| 2012/0020614 A1 * | 1/2012 | Han | G02F 1/0147 |
| | | | 385/17 |
| 2012/0308112 A1 | 12/2012 | Hu et al. | |
| 2013/0201461 A1 | 8/2013 | Huang et al. | |
| 2014/0101624 A1 | 4/2014 | Wu et al. | |
| 2014/0111779 A1 | 4/2014 | Chen et al. | |
| 2014/0119638 A1 | 5/2014 | Chang et al. | |
| 2014/0123084 A1 | 5/2014 | Tang et al. | |
| 2014/0226893 A1 | 8/2014 | Lo et al. | |
| 2014/0253901 A1 | 9/2014 | Zhou et al. | |
| 2014/0256067 A1 | 9/2014 | Cheng et al. | |
| 2014/0257761 A1 | 9/2014 | Zhou et al. | |
| 2014/0266386 A1 | 9/2014 | Huang et al. | |

* cited by examiner

DIRECTIONALLY TUNABLE OPTICAL REFLECTOR

PRIORITY DATA

The present application is a utility U.S. patent application of provisional U.S. patent application No. 63/164,044, filed on Mar. 22, 2021, entitled "Optical Device With a Tunable Reflector", the disclosure of which is hereby incorporated by reference in its entirety.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs.

Optical waveguides, which confine and guide radiation waves such as light, are used as components in integrated optical circuits that provide various functions. Optical switches (which may or may not include portions of the optical waveguides) have also been implemented to direct the path of the radiation waves traveling via the optical waveguides. However, conventional optical switches often have various shortcomings, such as their lack of flexibility, bulky size, excessive power consumption, and/or inefficiencies related to the signal propagation.

Thus, while conventional optical switches are generally adequate for their intended purposes, they are not entirely satisfactory in every aspect.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
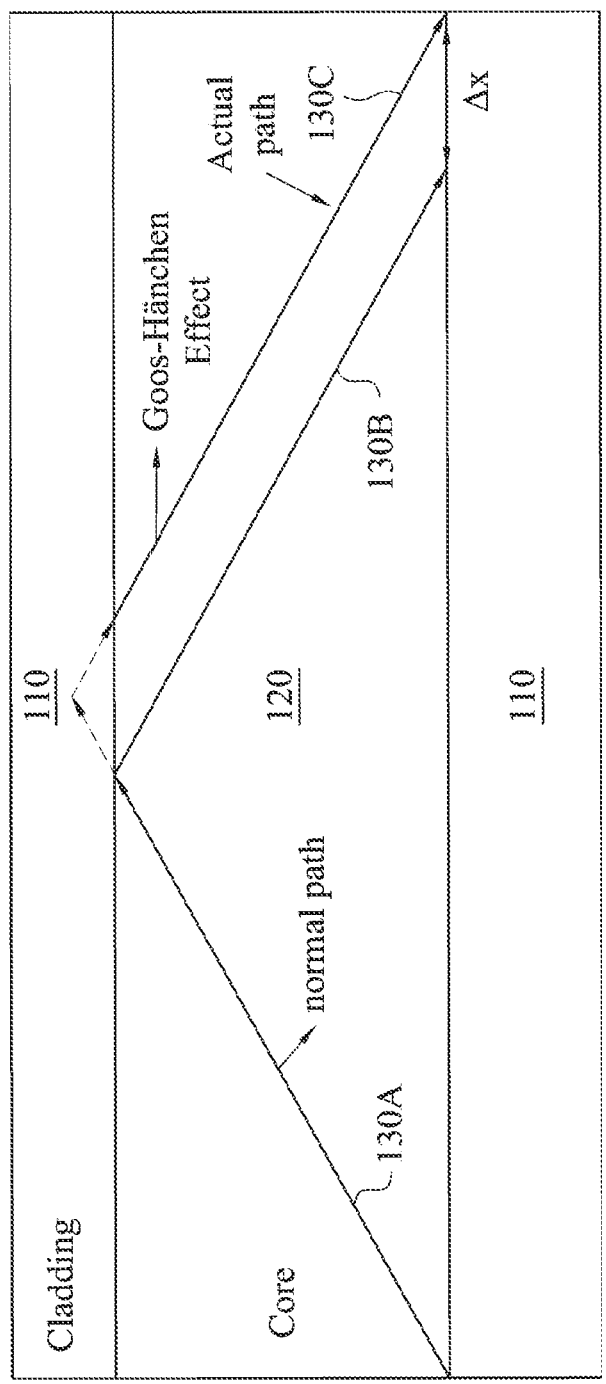
FIG. 1 illustrates a Goos-Hänchen Effect.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Still further, when a number or a range of numbers is described with "about," "approximate," "substantially," and the like, the term is intended to encompass numbers that are within +/−10% of the number described, unless otherwise specified. For example, the term "about 5 nm" encompasses the dimension range from 4.5 nm to 5.5 nm.

This application relates to an optical device and more particularly to an optical device with a tunable reflector and a method for manufacturing and operating the optical device. In more detail, optical circuits have employed the transmission of light (as a form of radiation) to perform similar types of computational tasks that have been traditionally handled by electrical circuits via the transmission of electrical signals. For example, conventional optical circuits typically use phase shifters to achieve constructive interference and destructive interference of light, which allows an optical switch to select the output path of light. However, as semiconductor device sizes continue to get scaled down, conventional optical circuits have exhibited shortcomings. For example, the conventional optical switches may occupy too large of a footprint on the optical circuits, consume an excessive amount of power, and/or propagate the optical signals too inefficiently.

The present disclosure introduces a new type of optical switch implemented using tunable reflectors to overcome the shortcomings of the conventional optical circuits. The tunable reflectors are connected to input waveguides and output waveguides. The refractive index of a cladding portion of the reflector structure is smaller than the refractive index of the waveguides. Multiple metal layers are disposed near the waveguide and surrounding the reflector. By applying different voltages to at least one of the metal layers to change the carrier concentration or the temperature of one or more regions of the reflector facing the waveguide, the refractive index at or near the interface of the waveguide and the reflector can be flexibly tuned.

Therefore, when an incident light is projected to the surface, the incident light can be reflected by the reflector toward a desired direction. In this device, selection of optical path is based on the degree of reflection, instead of a constructive or destructive interference phenomenon. Therefore, loss of optical power can be reduced. In addition, the degree of reflection can be controlled by the variation of temperature or carrier concentration at the interface of the waveguide and the reflector, and thus the optical path can achieve a high degree of tunability according to the reflection phenomenon. In addition, compared to the conventional optical switches, the switches implemented herein typically consume less power and have a substantially smaller footprint. The details of the device of the present disclosure are described below.

FIG. 1 illustrates a Goos-Hänchen Effect in optical switches implemented according to various aspects of the present disclosure. Referring to FIG. 1, an optical device may include a cladding layer 110 and a core layer 120. The cladding layer 110 may be used to implement parts of the reflector structure according to embodiments of the present disclosure. In various embodiments, the cladding layer 110 may include silicon oxide ($SiO_2$), silicon nitride ($Si_3N_4$), silicon oxynitride (SiON), or a polymer material. The core layer 120 may be used to implement waveguides for the propagation of electromagnetic radiation waves, such as an incident light 130A and/or an output light (e.g., a reflected light 130B or 130C) according to various aspects of the present disclosure. In various embodiments, the core layer 120 may include silicon, $SiO_x$, $Si_3N_4$, a polymer (e.g., polyimide, polybenzoxazoles (PBO)), or $SiO_xN_y$.

Regardless of the specific materials chosen for the cladding layer 110 and the core layer 120, their material compositions are carefully configured to ensure that a refractive index of the cladding layer 110 is smaller than a refractive index of the core layer 120, so that a total reflection of an incident light 130A can be achieved. For example, due to the core layer 120 having a greater refractive index than the cladding layer 110, the incident light 130A, upon hitting the interface between the cladding layer 110 and the core layer 120, should be reflected 100% as reflected light 130B, as shown in FIG. 1, had the Goos-Hänchen Effect not been present.

However, according to the Goos-Hänchen Effect, linearly polarized light will undergo a small lateral shift when it undergoes total reflection, as if the incident light had briefly penetrated the interface between the cladding layer 110 and the core layer 120 before being reflected. As such, the reflected path of the incident light 130A is shifted laterally by a distance $\Delta x$, which means that the incident light 130A is actually reflected as the reflected light 130C.

It is understood that although FIG. 1 illustrates an example where the interface between the cladding layer 110 and the core layer 120 is substantially linear or straight, the Goos-Hänchen Effect may apply to interfaces that are elliptical, parabolic, curvilinear, or have other arbitrary shapes as well. In addition, changes in carrier concentration and/or temperature at or near the interface between the cladding layer 110 and the core layer 120 also have an impact on the distance $\Delta x$. The present disclosure carefully configures the carrier concentration and/or temperature at or near such an interface to flexibly tune the path of the reflected light, as will be discussed below in more detail.

Figure 2B:
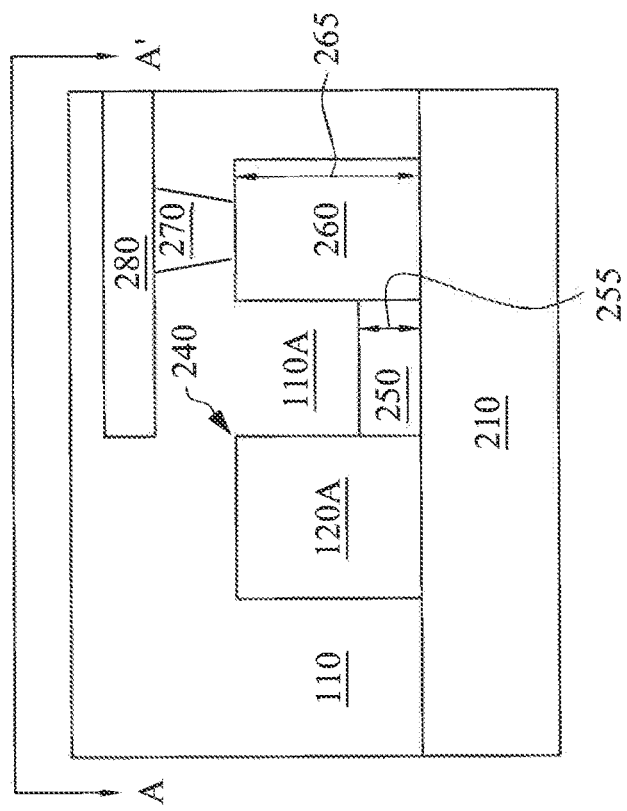
FIGS. 2A-2D, 3A-3D, 4A-4B, 5A-5B, 6A-6B, 7A-7B, 8, and 9A-9B illustrate diagrammatic views of portions of optical circuits according to embodiments of the present disclosure.
Figure 2A:
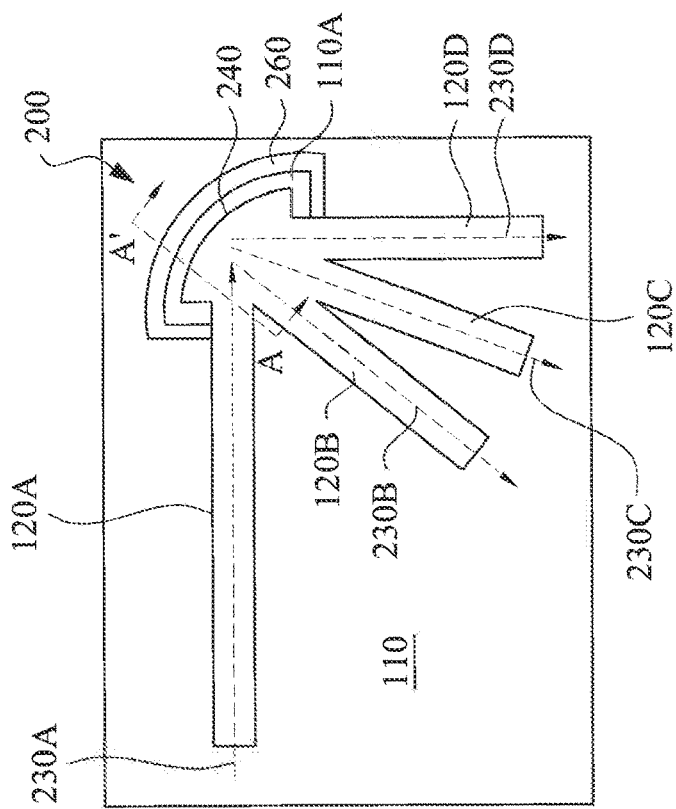

FIG. 2A illustrates a top view of a portion of an optical circuit, and FIG. 2B illustrates a cross-sectional view of a portion of the optical circuit of FIG. 2A, according to a first embodiment of the present disclosure. Specifically, FIG. 2B generally corresponds to a cross-sectional cut along a cutline A-A' of the optical device in FIG. 2A.

The optical device of FIGS. 2A-2B includes a tunable optical reflector structure 200. As shown in FIG. 2B, the optical reflector structure 200 is formed over a buried oxide 210. In some embodiments, the buried oxide 210 may be formed over a semiconductor substrate, such as a silicon substrate. In some embodiments, the optical reflector structure 200 may be formed over another suitable material, for example, another dielectric material or another semiconductive material.

The optical reflector structure 200 includes a portion 110A of the cladding layer 110 discussed above, hereinafter referred to as a cladding portion 110A. For example, the cladding portion 110A (along with the rest of the cladding layer 110) is formed over the buried oxide 210 (see FIG. 2B) and may include materials such as silicon oxide, silicon nitride, silicon oxynitride, or a polymer.

The optical reflector structure 200 is configured to interact with a plurality of waveguides that are formed over the buried oxide 210 to re-direct light. The waveguides may include an input waveguide 120A and a plurality of output waveguides 120B, 120C, and 120D. As discussed above, the waveguides 120A-120D are also referred to as core layers and may be implemented using materials such as silicon, silicon oxide, silicon nitride, silicon oxynitride, or a polymer. Note that although the embodiment illustrated in FIGS. 2A-2B include just one input waveguide, it is not intended to be limiting. In other embodiments, multiple input waveguides may be implemented, as will be discussed in greater detail below.

According to various aspects of the present disclosure, the material compositions of the cladding portion 110 and the waveguides 120A-120D are configured such that the waveguides 120A-120D each have a greater refractive index than the cladding portion 110A. Such a configuration ensures that total reflection of light can be achieved. In that regard, an incident light 230A propagates as an input light through the input waveguide 120A. The optical reflector structure 200 is configured to receive the incident light 230A as an input, and upon the incident light hitting an interface 240 (or slightly past it per the Goos-Hänchen Effect) between the input waveguide 120A and the cladding portion 110A, reflect the incident light 230A as an output light.

The output light may propagate in a targeted output waveguide 120B-120D as a reflected light 230B, 230C, or 230D. For example, the optical reflector structure 200 may redirect the incident light 230A into the path corresponding to the output waveguide 120B as an output light 230B, or redirect the incident light 230A into the path corresponding to the output waveguide 120C as an output light 230C, or redirect the incident light 230A into the path corresponding to the output waveguide 120D as an output light 230D, as discussed in more detail below.

According to the first embodiment of the present disclosure, the optical reflector structure 200 achieves the tuning flexibility via a change in carrier concentration. In that regard, the optical reflector structure 200 includes a lightly doped portion 250 and a heavily doped portion 260. The lightly doped portion 250 and the heavily doped portion 260 are both formed over the buried oxide 210, as shown in the cross-sectional view of FIG. 2B. The lightly doped portion 250 is formed below the cladding portion 110A and is located directly adjacent to the input waveguide 120A. For example, the lightly doped portion 250 may be in direct physical contact with the input waveguide 120A. The heavily doped portion 260 is formed on the other side of the lightly doped portion 250. As such, the lightly doped portion 250 is disposed in between the heavily doped portion 260 and the input waveguide 120A. The lightly doped portion 250 and the heavily doped portion 260 may each be doped with an N type dopant, or they may each be doped with a P type dopant. However, the dopant concentration level within the heavily doped portion 260 is greater than the dopant concentration level within the lightly doped portion 250. The lightly doped portion 250 and the heavily doped portion 260 may be formed using one or more ion implantation and/or diffusion processes.

The optical reflector structure 200 further includes a conductive via 270 formed over an upper surface of the heavily doped portion 260, as well as a conductive pad 280 formed over the conductive via 270. The conductive via 270 and the conductive pad 280 each include a metal or a metal compound, such as copper, aluminum, tungsten, titanium, cobalt, or combinations thereof. Note that the conductive via 270 and the conductive pad 280 are not specifically illustrated in FIG. 2A for the sake of visual clarity and simplicity.

The conductive via 270 and the conductive pad 280 are capable of providing electrical connectivity between the optical reflector structure 200 and external devices. For example, the optical reflector structure 200 may be implemented as a part of an optical switch inside a photonic integrated circuit (IC). An electrical IC (not illustrated in FIGS. 2A-2B herein) that is located external to the photonic IC may contain electrical circuitry to generate electrical control signals for controlling the optical reflector structure 200. Such electrical signals (e.g., voltage) may be sent to the optical reflector structure 200 through the conductive pad 280 and the conductive via 270. It is understood that in the embodiment illustrated herein, no current is generated in response to the application of voltage, because the optical circuit herein is an open circuit.

As the electrical signals are applied to the heavily doped portion 260 and/or the lightly doped portion 250, the carriers (which may be electrons in some embodiments or may be holes in other embodiments) within the heavily doped portion 260 and/or the lightly doped portion may diffuse or otherwise move toward the interface 240 between the input waveguide 120A and the cladding portion 110A. Some of the carriers may diffuse through the interface 240 and move into the input waveguide 120A, which changes the carrier concentration at or near the interface 240. Such a change in carrier concentration at or near the interface 240 leads to a change in the refractive index of the input waveguide 120A (and possibly a change in the refractive index of the cladding portion 110A as well). Per the Goos-Hänchen Effect discussed above with reference to FIG. 1, the change in the refractive index of the input waveguide 120A relative to the cladding portion 110A causes a change in the shift in the path of the reflected light. In other words, the direction or angle of the reflected light is effectively shifted as a result of the application of the electrical signals to the optical reflector structure 200.

Using the embodiment of optical reflector structure 200 shown in FIG. 2A as a simplified example, an application of a first electrical signal may cause the incident light 230A propagating through the input waveguide 120A to be reflected as an output light 230B that propagates out through the output waveguide 120B. An application of a second electrical signal may cause the incident light 230A propagating through the input waveguide 120A to be reflected as an output light 230C that propagates out through the output waveguide 120C. An application of a third electrical signal may cause the incident light 230A propagating through the input waveguide 120A to be reflected as an output light 230D that propagates out through the output waveguide 120D. In this manner, the optical reflector structure 200, working in conjunction with the external electrical circuitry, may flexibly re-direct the incident light 230A into the path of a targeted output waveguide.

As shown in FIG. 2B, the lightly doped portion 250 is configured to have a height 255, and the heavily doped portion 260 is configured to have a height 265. The heights 255 and 265 are not randomly chosen but rather are specifically configured to optimize device performance herein. In more detail, the lightly doped portion 250 herein may serve as a buffer region between the heavily doped portion 260 and the input waveguide 120A. An energy barrier for an Ohmic contact (i.e., an interface between any two regions with different doping concentration levels) would be high if the doping concentration levels of the two regions forming such an Ohmic contact are drastically different, since it would be more difficult for the carriers to be injected from one region into the other. In other words, had the lightly doped portion 250 not been implemented, and that the interface 240 is formed directly between the heavily doped portion 260 and the input waveguide 120A, then a big difference exists in the doping concentration levels between the heavily doped region (having a high doping concentration level) and the input waveguide 120A (having a substantially zero doping concentration level prior to any carrier diffusion). Such a big difference in the doping concentration levels may make it difficult for the carriers to be injected into the input waveguide 120A from the heavily doped portion 260. However, with the lightly doped portion 250 serving as a buffer, it is much easier for the carriers to be injected from the heavily doped portion 260 into the input waveguide 120A. As such, the lightly doped portion 250 should have a sufficiently tall height 255, so that it can effectively serve as a buffer. Had the height 255 of the lightly doped portion 250 been too small in comparison to the height 265 of the heavily doped portion 260, then the lightly doped portion 250 may not adequately serve as a buffer, and as a result, it may still be difficult to inject carriers from the heavily doped portion 260 into the input waveguide 120A.

On the other hand, if the height 255 of the lightly doped portion 250 is too tall, that would lead to a reduction in the area or volume of the cladding portion 110A. As discussed above, the optical reflector structure 200 utilizes the combination of the cladding portion 110A and the input waveguide 120A to serve as a reflective interface to achieve total reflection. As the length of the interface 240 is reduced by a corresponding increase in the height 255 of the lightly doped portion 250, the optical reflector structure 200 may not function properly, or at least not optimally in reflecting the incident light 230A, since the interface 240 would have been substantially reduced. For these reasons discussed above, the height 255 is configured to be tall enough for the lightly doped portion 250 to adequately serve as a buffer, yet not too tall to interfere with the intended operations (e.g., reflection of the incident light 230A) of the optical reflector structure 200.

Figure 2C:
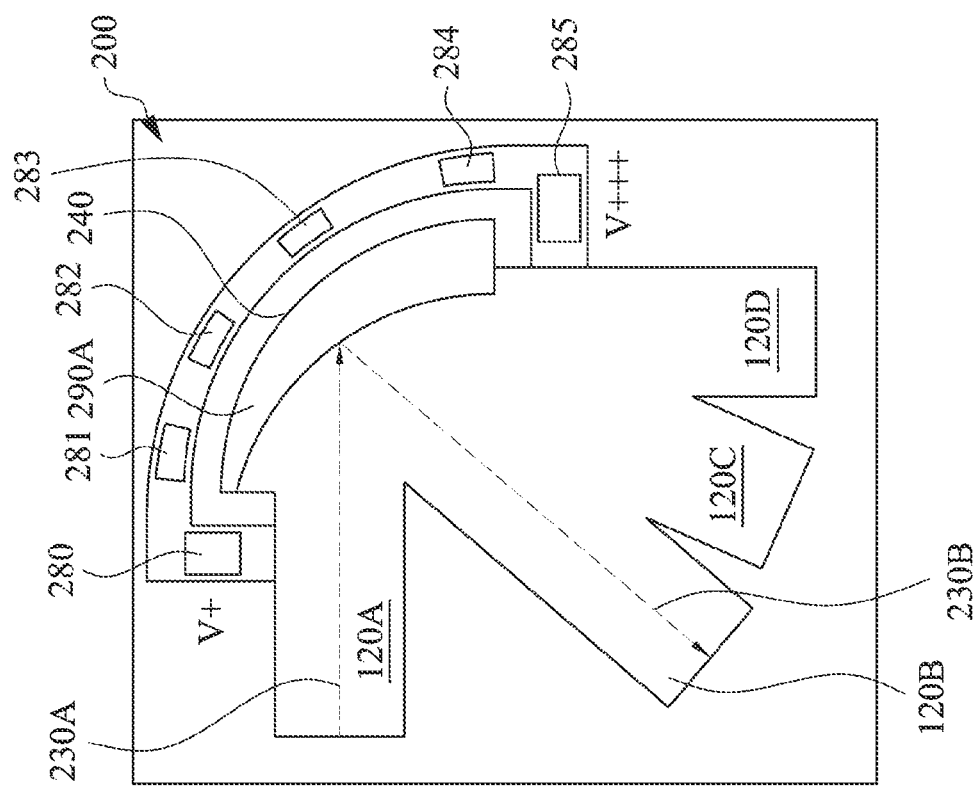
Figure 2D:
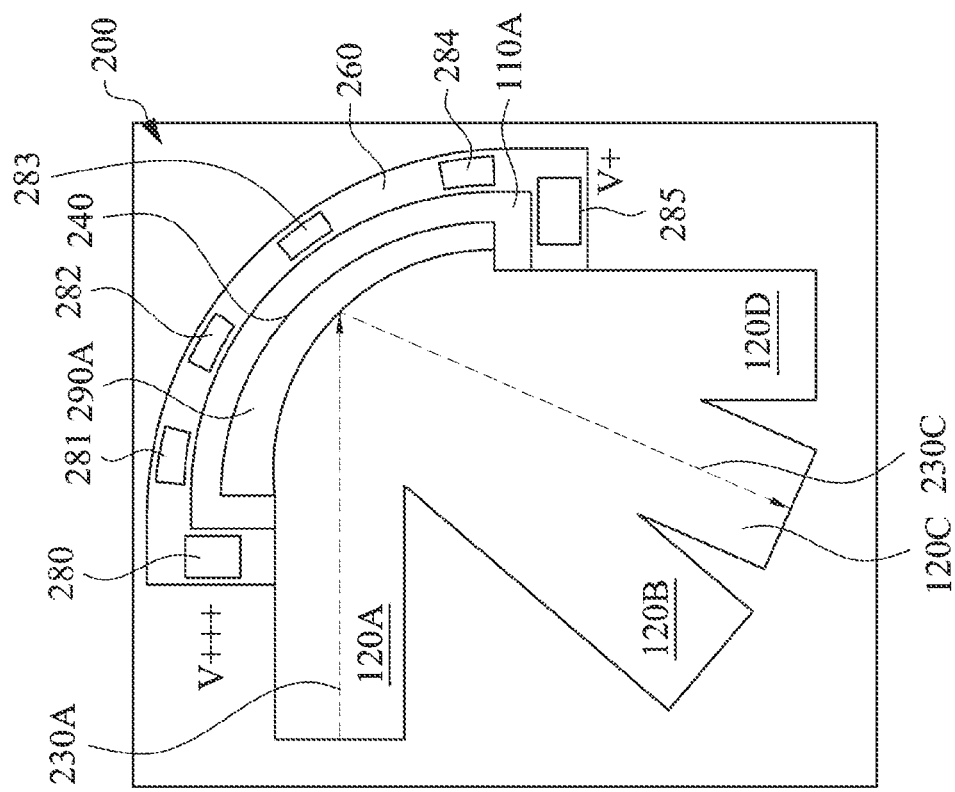

It is also understood that in some embodiments, multiple different electrical signals can be applied to the optical reflector structure 200 to produce a finely tuned profile for the carrier concentration profile. FIGS. 2C and 2D are top views of the optical reflector structure 200 that illustrate two examples of such carrier profiles 290A and 290B, respectively. As shown in FIGS. 2C and 2D, the optical reflector structure 200 includes a plurality of conductive pads 280-285 implemented over different regions of the heavily doped portion 260. Different voltages may be applied to the conductive pads 280-285. For example, a first voltage may be applied to the conductive pad 280, a second voltage may be applied to the conductive pad 281, a third voltage may be applied to the conductive pad 282, a fourth voltage may be applied to the conductive pad 283, a fifth voltage may be applied to the conductive pad 284, and a sixth voltage may be applied to the conductive pad 285. In the embodiment shown in FIG. 2C, the first voltage > the second voltage > the third voltage > the fourth voltage > the fifth voltage > the sixth voltage. For example, the first voltage may be V+++, the sixth voltage may be V+, and the second, third, fourth, and fifth voltages have values in between V+++ and V+. Conversely, in the embodiment shown in FIG. 2D, the first voltage (e.g., V+) < the second voltage < the third voltage < the fourth voltage < the fifth voltage < the sixth voltage (e.g., V+++).

The application of different voltages (or other types of suitable electrical signals) cause different amounts of the carriers to be injected from the heavily doped portion 260 into the input waveguide 120A. Most of the carriers injected into the input waveguide 120A are still distributed at or near the interface 240 between the input waveguide 120A and the cladding portion 110A. However, due to the differences in the voltages being applied through the conductive pads 280-285, the carrier concentration profiles 290A and 290B are shaped differently. In the embodiment of FIG. 2C, since the first voltage applied through the conductive pad 280 is the greatest, and the sixth voltage applied through the conductive pad 285 is the lowest, the carrier concentration profile 290A is shaped such that the carrier concentration level within the waveguide 120A is the greatest near the conductive pad 280, the lowest near the conductive pad 285, where it also gradually declines as the location within the waveguide 120A gets farther away from the conductive pad 280 and closer to the conductive pad 285.

Conversely, in the embodiment of FIG. 2D, since the sixth voltage applied through the conductive pad 285 is the greatest, and the first voltage applied through the conductive pad 280 is the lowest, the carrier concentration profile 290B is shaped such that the carrier concentration level within the waveguide 120A is the greatest near the conductive pad 285, the lowest near the conductive pad 280, where it also gradually declines as the location within the waveguide 120A gets farther away from the conductive pad 285 and closer to the conductive pad 280.

The carrier concentration profile 290A corresponds to changes in the refractive indexes at different regions of the input waveguide 120A relative to the refractive index at the cladding portion 110A of the optical reflector structure 200, such that the incident light 230A is reflected by the cladding portion 110A into the output waveguide 120C. In other words, applying the voltages in the manner described in FIG. 2C allows the optical reflector structure 200 to re-direct the incident light 230A into the target output waveguide 120C as an output light 230C. On the other hand, the carrier concentration profile 290B corresponds to changes in the refractive indexes at different regions of the input waveguide 120A relative to the refractive index at the cladding portion 110A of the optical reflector structure 200, such that the incident light 230A is reflected by the cladding portion 110A into the output waveguide 120B. In other words, applying the voltages in the manner described in FIG. 2D allows the optical reflector structure 200 to re-direct the incident light 230A into the target output waveguide 120B as an output light 230B.

It is understood that although the carrier concentration profiles 290A and 290B indicate how the carrier concentration levels vary at the different regions of the waveguide 120A, they may or may not represent the actual geographical footprint of the carriers within the waveguide 120A in a top view. Furthermore, it is understood that the carrier concentration profiles 290A and 290B are merely non-limiting examples. Applying different voltages (or other suitable electrical signals) to the conductive pads 280-285 will generate different carrier concentration profiles within the input waveguide 120A, which allows the refractive indexes at different regions of the input waveguide 120A to be configured differently, and this in turn will cause the incident light 230A to be re-directed differently as well. Therefore, it can be seen that the optical reflector structure 200 can flexibly re-direct the incident light 230A merely by applying different electrical signals to the optical reflector structure 200. Furthermore, it is understood that the number of conductive pads (such as the conductive pads 280-285), their respective sizes or shapes, and/or their respective locations on the optical reflector structure 200 is also non-limiting and can be configured depending on the design needs and/or manufacturing requirements. By configuring the number, size/shape, and/or location of each of the conductive pads implemented on the heavily doped portion 260, the optical reflector structure 200 can further tune the resulting carrier concentration profile within the input waveguide 120A.

Compared to conventional optical switches that rely on constructive interference or destructive interference to control the propagation path of the light, the optical reflector structure 200 herein offers an improved optical switch with greater flexibility in the angle or degree of light re-direction, since multiple different electrical signals can be applied to the optical reflector structure (which may be done via different arrangements of conductive pads) to fine tune the carrier concentration profile 290A or 290B within the waveguide 120A at or near the interface 240. In addition, since the incident light 230A is reflected at 100% (i.e., total reflection), the optical reflector structure 200 has a reduced power consumption compared to the conventional optical switches, where every stage of light switching reduces the output power by about 50%. Furthermore, the optical reflector structure 200 herein has a much smaller footprint compared to conventional optical switches.

Figure 3B:
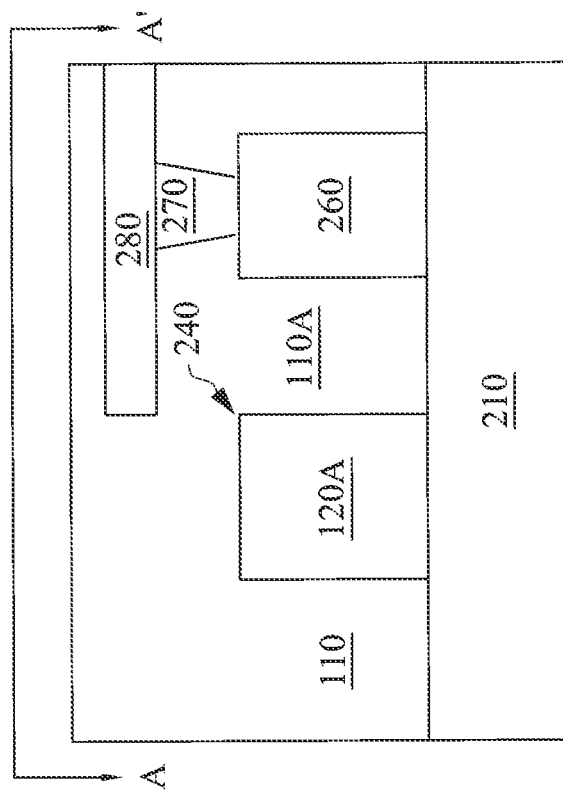
Figure 3A:
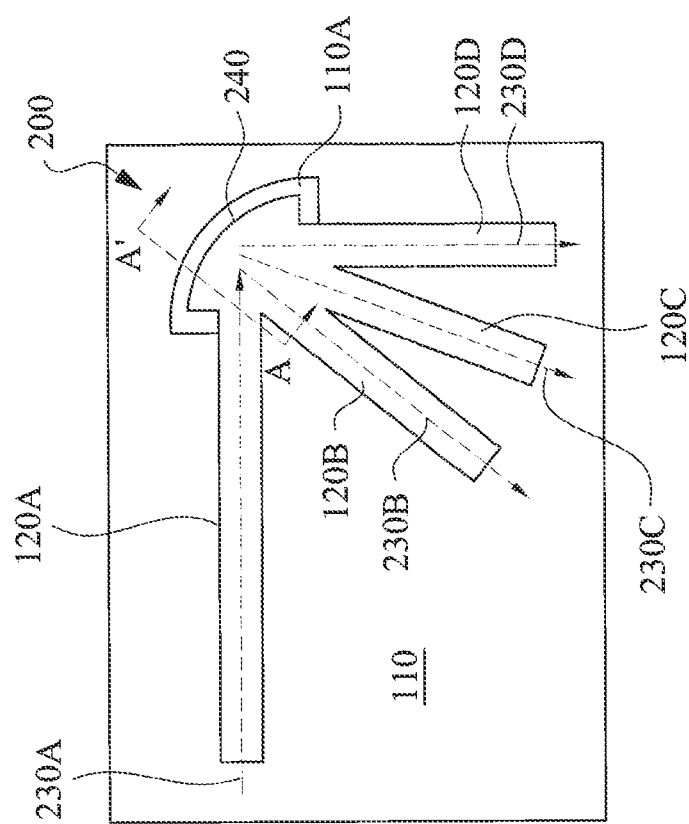

FIG. 3A illustrates a top view of a portion of an optical circuit, and FIG. 3B illustrates a cross-sectional view of a portion of the optical circuit corresponding to FIG. 3A, according to a second embodiment of the present disclosure. Specifically, FIG. 3B generally corresponds to a cross-sectional cut along the cutline A-A' of the optical device in FIG. 3A. For reasons of consistency and clarity, similar components in the first embodiment (discussed above with reference to FIGS. 2A-2D) and the second embodiment will be labeled the same.

Similar to the first embodiment, the optical reflector structure 200 of the second embodiment includes a cladding portion 110A that forms an interface 240 with the input waveguide 120A. The optical reflector structure 200 also includes the heavily doped portion 260, the conductive via 270 formed on the heavily doped portion 260, and the conductive pad 280 formed on the conductive via 270. Unlike the first embodiment, however, the optical reflector structure 200 of the second embodiment need not form the lightly doped portion 250. This is because the second embodiment does not use carrier diffusion to change the refractive index within the input waveguide 120A in order to re-direct the incident light 230A. Instead, the optical reflector structure 200 of the second embodiment causes a variation of temperature to directionally tune the reflected light.

In more detail, the conductive pad 280 is electrically coupled to the electrical IC discussed above, which is located external to the photonic IC in which the optical reflector structure 200 is implemented. The electrical IC may contain electrical circuitry to generate and send electrical signals (e.g., voltage) to the optical reflector structure 200 through the conductive pad 280, the conductive via 270, and other similar conductive vias not specifically shown herein. The other conductive vias are implemented to connect different regions of the conductive pad 280 with the heavily doped portion 260. A closed circuit is formed by the conductive pad 280 and the conductive vias (including the conductive via 270) for the conduction of electrical current therein. Thus, the application of the voltage to the conductive pad 280 generates thermal energy (e.g., heat) due to the inherent resistance of the conductive pad 280 and the other conductive elements through which electrical current is run. It is understood that the heavily doped portion 260 may also generate thermal energy in response to the application of voltage on the conductive pad 280.

Since the conductive pad 280 is located adjacent to (or possibly over) the input waveguide 120A, the heat produced by the conductive pad 280 affects the portions of the input waveguide 120A at or near the interface 240 as well, which changes the refractive index in these affected portions of the input waveguide 120A. As discussed above, the change in the refractive index of the input waveguide 120A relative to the refractive index of the cladding portion 110A will cause the path of the reflected light to shift. In this manner, the second embodiment of the optical reflector structure 200, while working in conjunction with the control circuitry of the electrical IC, is capable of tunably re-directing the incident light 230A as a reflected light 230B into the output waveguide 120B, or as a reflected light 230C into the output waveguide 120C, or as a reflected light 230D into the output waveguide 120D.

Figure 3D:
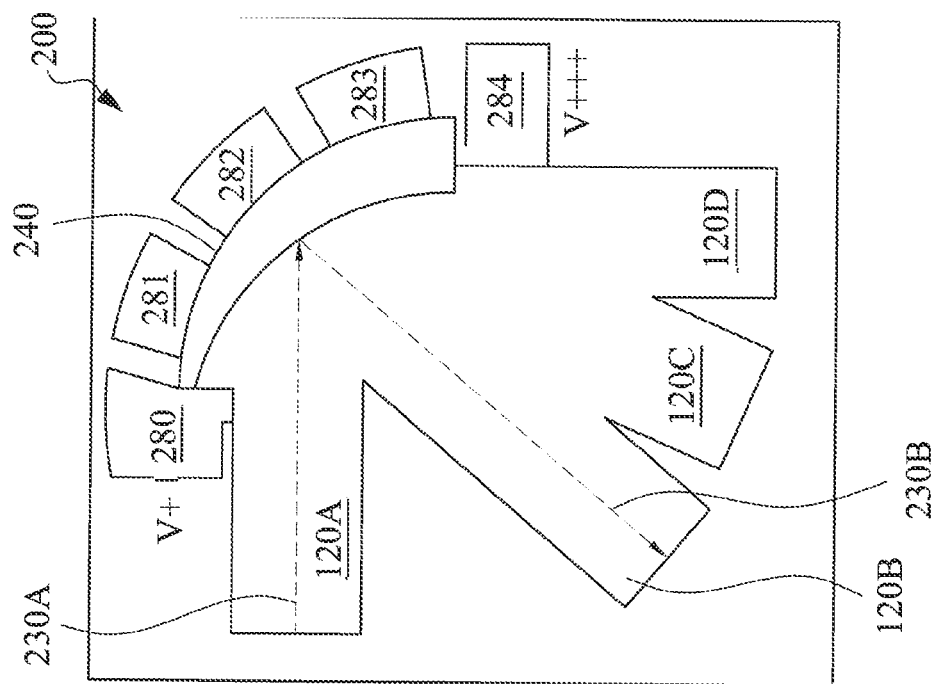
Figure 3C:
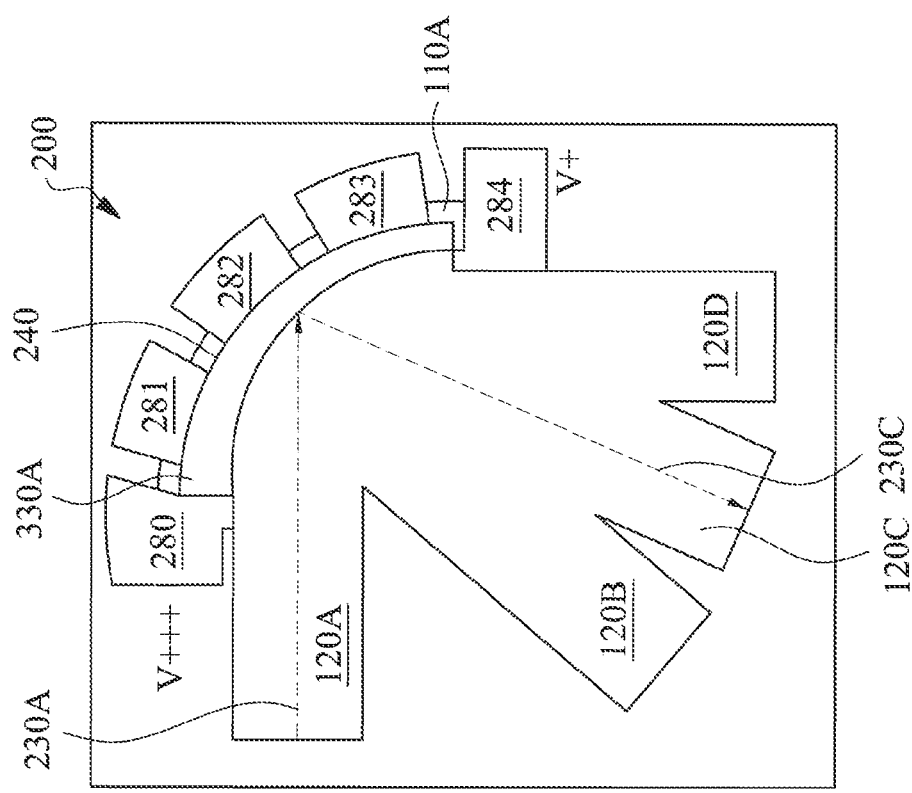

Similar to the first embodiment where different voltages may be applied to the optical reflector structure 200 to produce different carrier concentration levels, the second embodiment may apply different voltages to the optical reflector structure 200 to produce different amounts of thermal energy, in order to finely control the path of the reflected light. FIGS. 3C and 3D are top views of the second embodiment of the optical reflector structure 200 that illustrate two examples of such carrier profiles 290C and 290D, respectively. As shown in FIGS. 3C and 3D, the optical reflector structure 200 includes a plurality of conductive pads 280-284 implemented over different regions of the heavily doped portion 260. In some embodiments, each of the conductive pads 280-284 may be coupled to the heavily doped portion through two different conductive vias (e.g., vias similar to the conductive via 270), so that a closed loop connection may form for each of the conductive pads 280-284.

Different voltages may then be applied to the conductive pads 280-284. For example, a first voltage may be applied to the conductive pad 280, a second voltage may be applied to the conductive pad 281, a third voltage may be applied to the conductive pad 282, a fourth voltage may be applied to the conductive pad 283, and a fifth voltage may be applied to the conductive pad 284. In the embodiment shown in FIG. 3C, the first voltage (V+++) > the second voltage > the third voltage > the fourth voltage > the fifth voltage (V+). Conversely, in the embodiment shown in FIG. 3D, the first voltage (e.g., V+) < the second voltage < the third voltage < the fourth voltage < the fifth voltage (e.g., V+++).

The application of different voltages causes different amounts of heat to be generated by the conductive pads 280-284 (or even by the heavily doped portion 260 below). For example, in the embodiment of FIG. 3C, the conductive pad 280 generates the most amount of heat, the conductive pad 284 generates the least amount of heat, and the conductive pads 281-283 generate varying amounts of heat between the amounts of heat generated by the conductive pads 280 and 284. On the other hand, in the embodiment of FIG. 3D, the conductive pad 280 generates the least amount of heat, the conductive pad 284 generates the most amount of heat, and the conductive pads 281-283 generate varying amounts of heat between the amounts of heat generated by the conductive pads 280 and 284.

The varying amounts of heat generated by the conductive pads 280-284 help produce differently shaped temperature profiles 300A (see FIGS. 3C) and 300B (see FIGS. 3D) in the portions of the input waveguide 120A at or near the interface 240. In the embodiment of FIG. 3C, the temperature profile 300A is shaped such that the waveguide 120A is the hottest near the conductive pad 280, the coldest near the conductive pad 284, where the temperature of the input waveguide 120A along the interface 240 also gradually declines the farther away it gets from the conductive pad 280 and the closer it gets to the conductive pad 284. Such a temperature profile 300A (and the corresponding changes in the refractive index of the input waveguide 120A) causes the incident light 230A to be re-directed by the optical reflector structure 200 into the output waveguide 120C as the output light 230C.

Conversely, in the embodiment of FIG. 3D, the temperature profile 300B is shaped such that the waveguide 120A is the hottest near the conductive pad 284, the coldest near the conductive pad 280, where the temperature of the input waveguide 120A along the interface 240 also gradually declines the farther away it gets from the conductive pad 284 and the closer it gets to the conductive pad 280. Such a temperature profile 300B (and the corresponding changes in the refractive index of the input waveguide 120A) causes the incident light 230A to be re-directed by the optical reflector structure 200 into the output waveguide 120B as the output light 230B.

It is understood that although the temperature profiles 300A and 300B indicate how the temperatures vary at the different regions of the waveguide 120A, they may or may not represent the actual geographical footprint of the regions within the waveguide 120A having such temperatures in a top view. Furthermore, it is understood that the carrier concentration profiles 300A and 300B are merely non-limiting examples. Applying different voltages (or other suitable electrical signals) to the conductive pads 280-284 will generate different temperature profiles within the input waveguide 120A, which allows the refractive indexes at different regions of the input waveguide 120A to be configured differently, and this in turn will cause the incident light 230A to be re-directed differently as well. Therefore, it can be seen that the optical reflector structure 200 can flexibly re-direct the incident light 230A merely by applying different electrical signals to the optical reflector structure 200. Furthermore, it is understood that the number of conductive pads (such as the conductive pads 280-284), their respective sizes or shapes, and/or their respective locations on the optical reflector structure 200 is also non-limiting and can be configured depending on the design needs and/or manufacturing requirements. By configuring the number, size/shape, and/or location of each of the conductive pads implemented on the heavily doped portion 260, the optical reflector structure 200 can further tune the resulting carrier concentration profile within the input waveguide 120A.

Figure 4B:
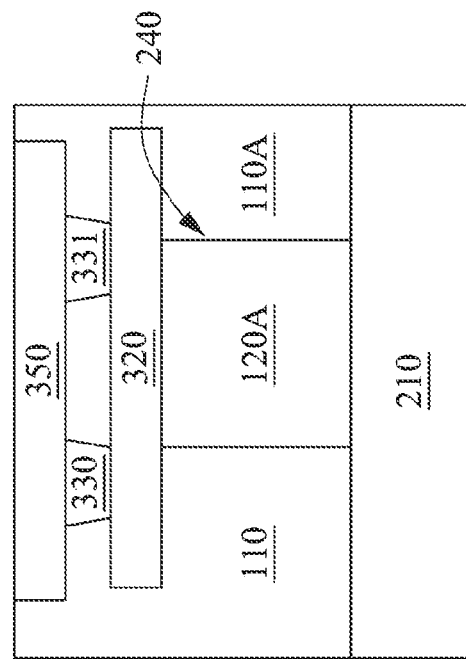
Figure 4A:
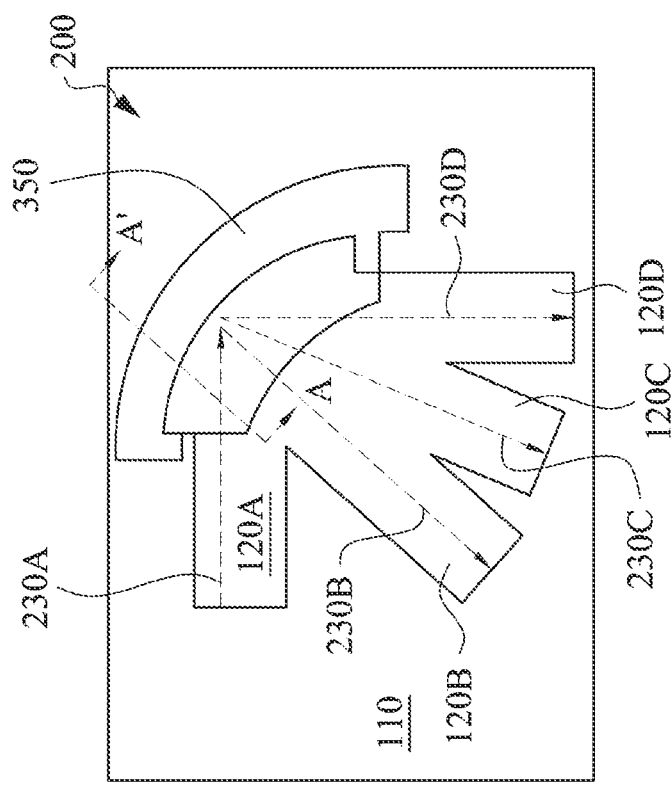

FIGS. 4A and 4B illustrate a top view and a cross-sectional view, respectively, of an optical circuit according to a third embodiment of the present disclosure. Again, FIG.

4B generally corresponds to a cross-sectional cut along the cutline A-A' of the optical device in FIG. 4A. For reasons of consistency and clarity, similar components in the embodiments discussed above with reference to FIGS. 2A-2D and 3A-3D will be labeled the same in the third embodiment of FIGS. 4A-4B.

Similar to the second embodiment, the third embodiment of the optical reflector structure 200 also utilizes heat generation to effectuate a change in the refractive index within portions of the input waveguide 120A, so that the incident light 230A can be tunably re-directed. However, rather than implementing conductive pads on the heavily doped portion 260 (and away from the input waveguide 120A, as is the case in the second embodiment discussed above), the third embodiment of the optical reflector structure 200 implements the conductive pads directly on the input waveguide 120A, and therefore thermal energy is generated and applied directly to the input waveguide 120A.

In more detail, the optical reflector structure 200 forms a conductive pad 320 directly on the upper surface of the input waveguide 120A, where portions of the conductive pad 320 may also extend laterally into the cladding portion 110A. The optical reflector structure 200 further includes conductive vias 330 and 331 located on different regions of the conductive pad 320, as well as a conductive pad 350 located over the conductive vias 330-331. The conductive pads 320 and 350 are electrically and physically coupled together by the conductive vias 330 and 331.

Electrical signals (e.g., voltage) may be generated by external circuitry and applied to the conductive pad 350, which forms a closed loop (or a closed circuit) with the vias 330-331 and the conductive pad 320. As a result, electrical current is conducted, and heat is generated due to the inherent resistance of the conductive pads 320 and 350 and the conductive vias 330-331. Similar to the second embodiment discussed above, the heat generated as a result of the application of the voltage will produce a certain temperature profile (e.g., similar to the temperature profile 300A or 300B discussed above) within the input waveguide 120A. Depending on where and how much the voltages are applied, the temperature profile within the input waveguide 120A can be shaped accordingly, which in turns changes the values of the refractive index within the different regions of the input waveguide 120A relative to the cladding portion 110A. Consequently, the incident light 230A can be reflected into one of the targeted output waveguides 120B, 120C, or 120D as the output light 230B, 230C, or 230D, respectively.

Note that although the third embodiment as illustrated utilizes a single conductive pad (e.g., either the conductive pad 320 or the conductive pad 350) directly over the input waveguide 120A, this is not intended to be limiting. In alternative embodiments, multiple different conductive pads similar to the conductive pad 320 or the conductive pad 350 (and with their corresponding vias) may be implemented directly on the input waveguide 120A, so as to more precisely tune the temperature profile of the input waveguide 120A.

In the first, second, and third embodiments discussed above, the interface 240 and/or other portions of the optical reflector structure 200 (such as the heavily doped portion 260) may each have a concave (e.g., concave with respect to the input waveguide 120A) curvilinear shape or profile in the top view. FIGS. 5A-5B, 6A-6B, and 7A-7B below describe embodiments where the interface 240 has a convex (e.g., convex with respect to the input waveguide 120A) curvilinear shape or profile in the top view. Again, for reasons of consistency and clarity, similar components in the embodiments discussed above and the embodiments below will be labeled the same.

Figure 5B:
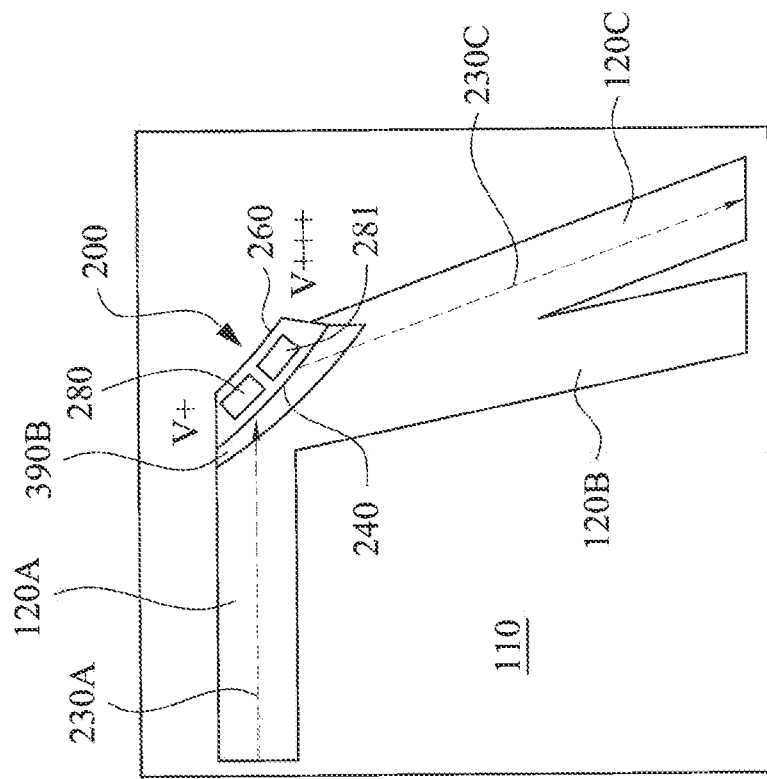
Figure 5A:
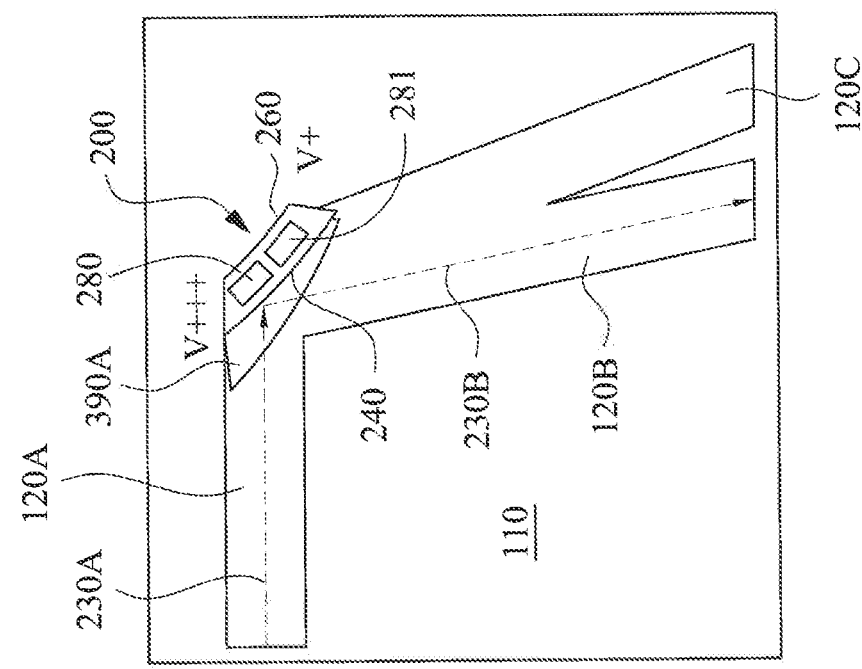

FIGS. 5A-5B illustrate top views of an optical circuit that includes a fourth embodiment of the optical reflector structure 200. Even though the fourth embodiment of the optical reflector structure 200 has a convex shape, it still shares similarities with the first embodiment, in that the optical reflector structure 200 implements conductive pads 280 and 281 over a heavily doped portion 260, such that voltages can be applied to the heavily doped portion 260 to cause carrier diffusion from the heavily doped portion 260 into the input waveguide 120A.

By configuring the voltages, different carrier concentration profiles 390A and 390B may be produced, as shown in FIGS. 5A and 5B, respectively. In the embodiment of FIG. 5A, since a greater voltage V+++ is applied to the conductive pad 280, and a smaller voltage V+ is applied to the conductive pad 281, the resulting carrier concentration profile 390A is greater near the conductive pad 280 and smaller near the conductive pad 281. As a result, the changes in the refractive index in the input waveguide 120A causes the incident light 230A to be reflected by the optical reflector structure 200 into the output waveguide 120B as the output light 230B. In the embodiment of FIG. 5B, since a greater voltage V+++ is applied to the conductive pad 281, and a smaller voltage V+ is applied to the conductive pad 280, the resulting carrier concentration profile 390B is greater near the conductive pad 281 and smaller near the conductive pad 280. As a result, the changes in the refractive index in the input waveguide 120A causes the incident light 230A to be reflected by the optical reflector structure 200 into the output waveguide 120C as the output light 230C. Based on the above discussions, it can be seen that although the fourth embodiment has a convex-shaped reflector, it can also effectively and flexibly tune the path of the reflected light by configuring the carrier concentration profile of the input waveguide 120A.

Figure 6B:
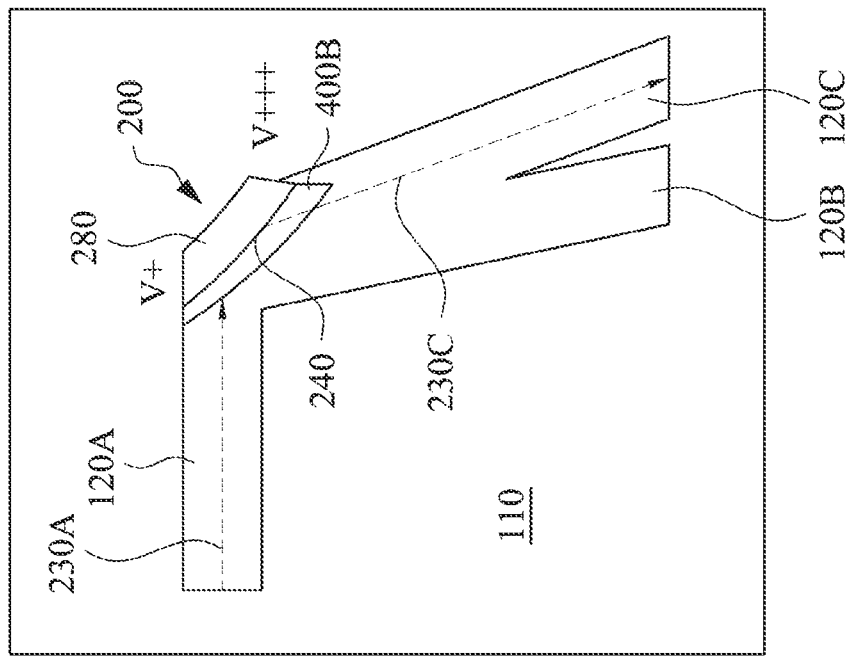
Figure 6A:
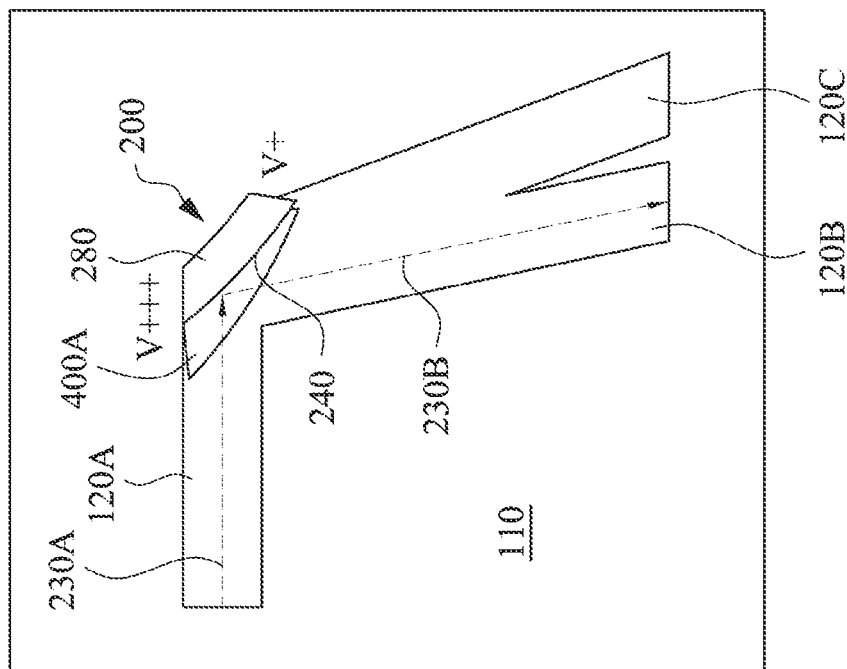

FIGS. 6A-6B illustrate top views of an optical circuit that includes a fifth embodiment of the optical reflector structure 200. Even though the fifth embodiment of the optical reflector structure 200 has a convex shape, it still shares similarities with the second embodiment, in that the optical reflector structure 200 implements one or more conductive pads such as the conductive pad 280 over a heavily doped portion (such as the heavily doped portion 260 discussed above), such that voltages can be applied to the conductive pad 280 to generate heat. By configuring the voltages applied to the conductive pad 280 (or other conductive pads), different temperature profiles 400A and 400B may be produced, as shown in FIGS. 6A and 6B, respectively. As a result, the temperature variations translate into variations in the refractive index, thereby allowing the optical reflector structure 200 to reflect the incident light 230A differently in FIGS. 6A and 6B. As such, although the fifth embodiment has a convex-shaped reflector, it can also effectively and flexibly tune the path of the reflected light by configuring the temperature profile of the input waveguide 120A.

Figure 7B:
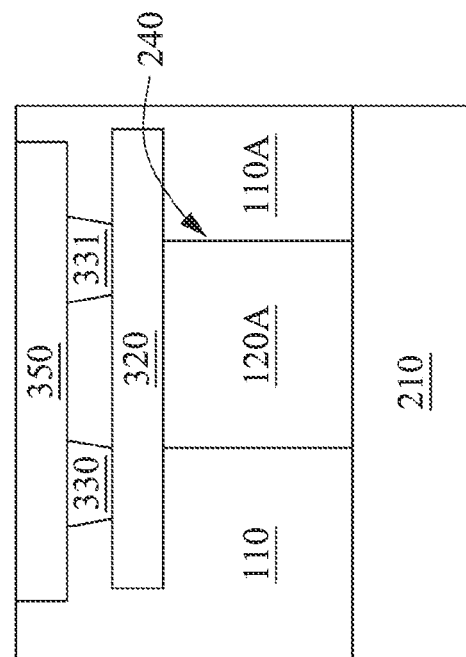
Figure 7A:
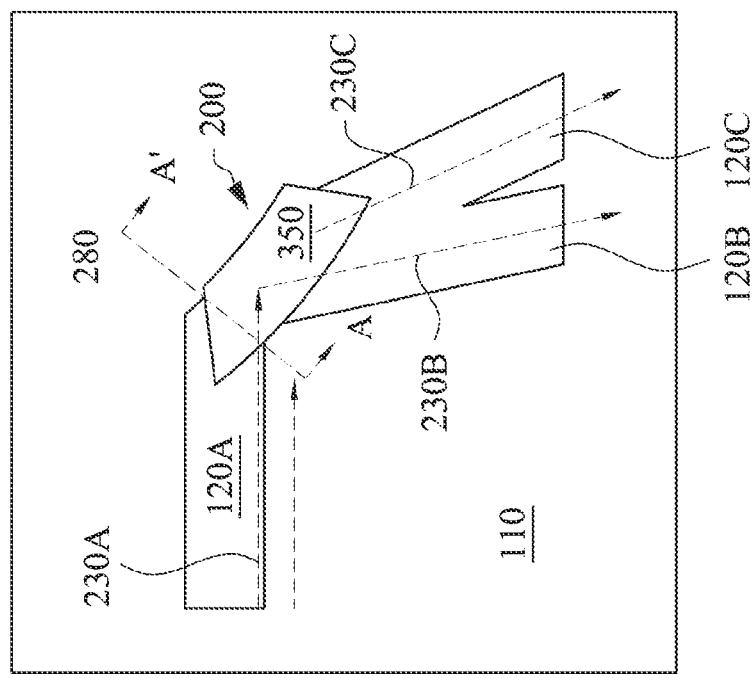

FIGS. 7A-7B illustrate a top view and a cross-sectional view of an optical circuit that includes a sixth embodiment of the optical reflector structure 200, respectively, where the cross-sectional view of FIG. 7B generally corresponds to a cross-sectional cut of the top view of FIG. 7A along the cutline A-A'. Even though the sixth embodiment of the optical reflector structure 200 has a convex shape, it still shares similarities with the third embodiment, in that the optical reflector structure 200 implements a conductive pad 320 directly on the input waveguide 120A, another conductive pad 350 over the conductive pad 320, and vias 330-331 that interconnects the conductive pads 320 and 350 together. Similar to the third embodiment discussed above with reference to FIGS. 4A-4B, the sixth embodiment also applies voltages to the conductive pad 350 to generate heat, which changes the refractive index of the input waveguide 120A. As such, although the sixth embodiment has a convex-shaped reflector, it can also effectively and flexibly tune the path of the reflected light 230B or 230C into either the output waveguide 120B or 120C by configuring the temperature profile of the input waveguide 120A.

It is also understood that the concave or convex curvilinear shape or profiles for the reflectors discussed above are not intended to be limiting unless otherwise specified. In alternative embodiments, the optical reflector structure may be configured to have linear or straight top view profiles, angular top view profiles, or arbitrarily-shaped profiles. Of course, it is understood that the carrier concentration profiles or the temperature profiles may be configured accordingly (depending on the shape or profile of the reflector). It is also understood that although silicon, silicon oxide, or silicon nitride may frequently be used to implement the input and output waveguides, polymer materials (e.g., polyimide) may also be used to implement waveguides in alternative embodiments.

Figure 8:
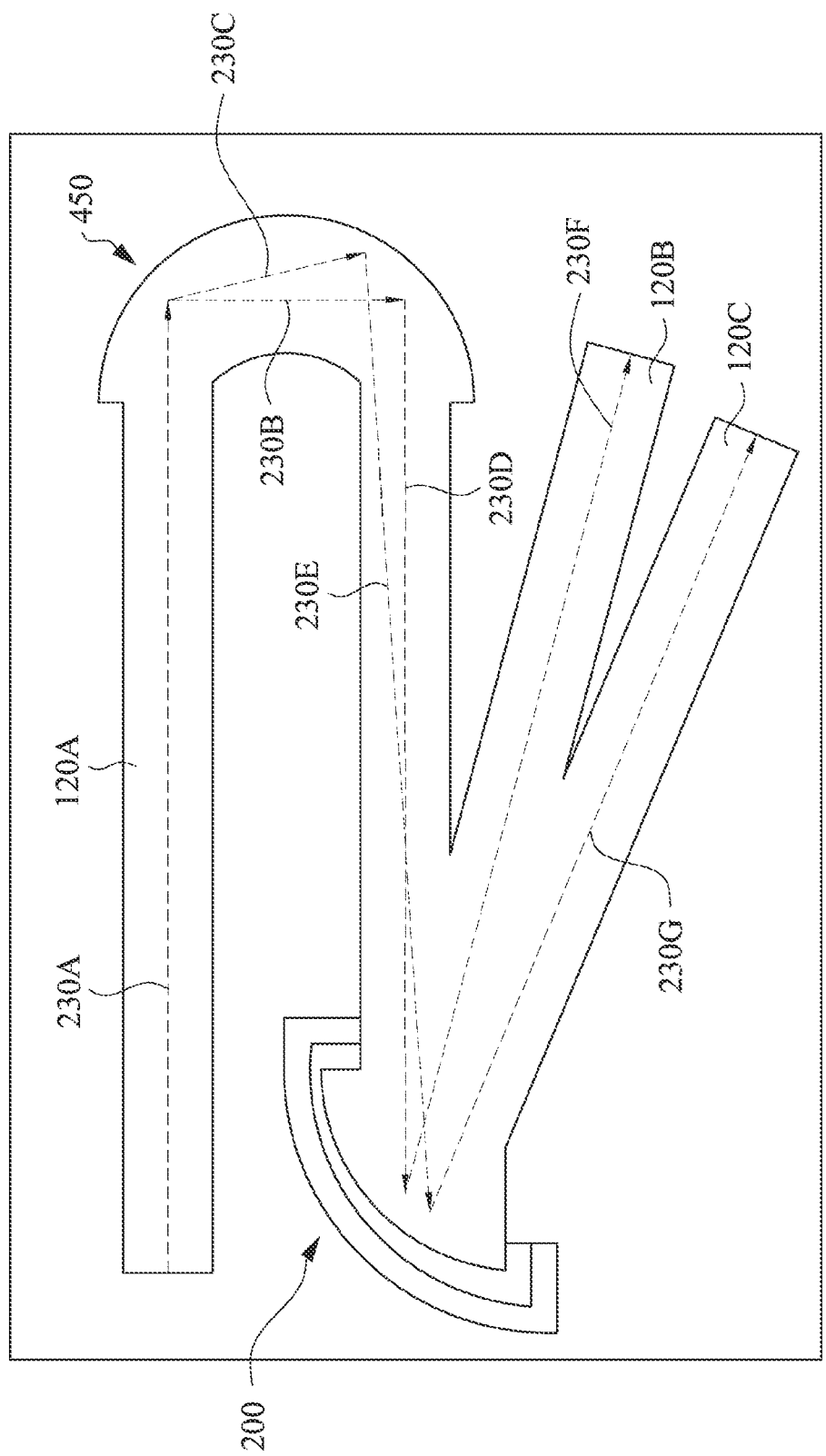

The optical reflector structure 200 discussed above can also be implemented with other reflectors to provide further light path tunability. For example, FIG. 8 illustrates the top view of a portion of an optical circuit that includes the optical reflector structure 200 and another reflector 450. The optical reflector structure 200 may be implemented using any of the embodiments discussed above. The reflector 450 may also be implemented as an embodiment of the optical reflector structure discussed above, or it may be implemented using another technique. Regardless of how the optical reflector structure 200 and the reflector 450 are implemented, they may work in conjunction with one another to reflect an incident light 230A (propagating in the input waveguide 120A) differently.

As a non-limiting example, the incident light 230A may be reflected by the reflector 450 into two different reflected lights 230B and 230C, which already diverge in their paths, as shown in FIG. 8. The reflected light 230B and the reflected light 230C are further reflected by the reflector 450 as reflected light 230D and 230E, respectively. The reflected light 230D is reflected again by the optical reflector structure 200, which produces a reflected light 230F as an output that propagates via the output waveguide 120B. The reflected light 230E is reflected again by the optical reflector structure 200, which produces a reflected light 230G as an output that propagates via the output waveguide 120C.

In this simplified example, the optical reflector structure 200 alone may or may not be able to produce the two output light paths. However, since the reflector 450 itself can already produce divergent light paths for the incident light 230A, its combination with the optical reflector structure 200 can achieve a greater variety or flexibility of output light paths than either the optical reflector structure 200 or the reflector 450 alone can produce. In this manner, the reflector 450 may offer an additional degree of freedom in tuning the output path of the reflected light.

Figure 9A:
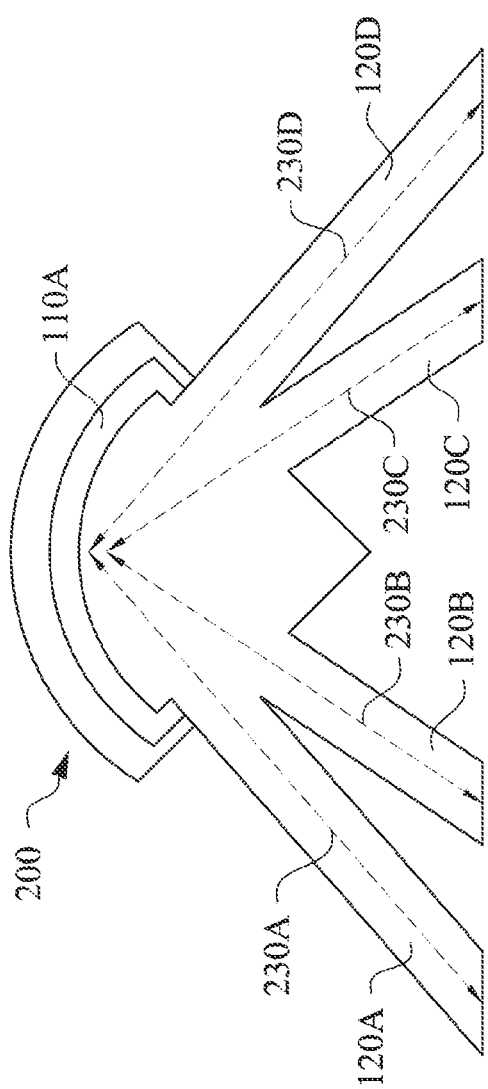
Figure 9B:
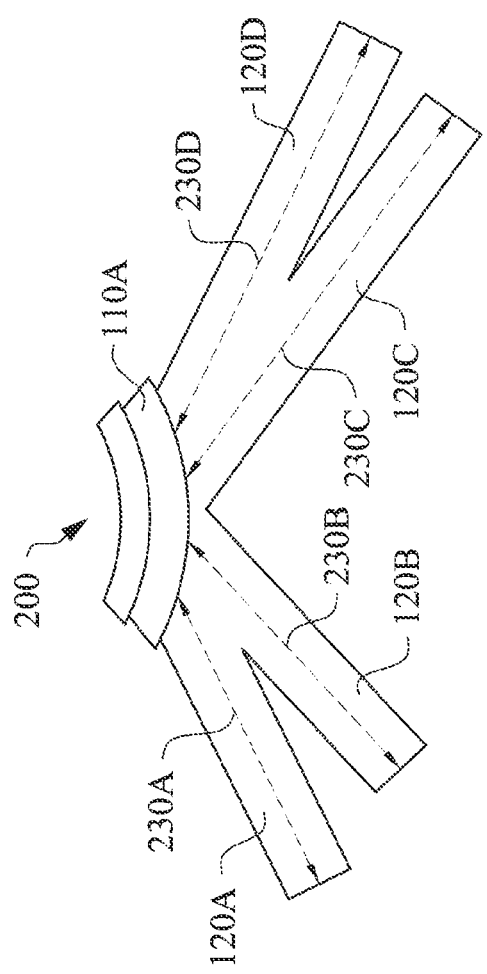

Another characteristic of the optical circuit herein is that it can have a multi-in-multi-out (MIMO) structure. In other words, each waveguide may be used as either an input or an output. For example, referring now to FIGS. 9A-9B, two different embodiments of the optical reflector structure 200 discussed above may be used to implement example MIMO structures of optical devices. The embodiment shown in FIG. 9A may include an optical reflector structure 200 with a concave shape, whereas the embodiment shown in FIG. 9B may include an optical reflector structure 200 with a convex shape. In either of these embodiments, the optical reflector structure 200 may be implemented using the carrier diffusion/injection technique (e.g., the first or fourth embodiments), or the thermal heating technique discussed above (e.g., the second, third, fifth, or sixth embodiments).

Regardless of the embodiment used to implement the optical reflector structure 200, it interacts with multiple waveguides such as waveguides 120A, 120B, 120C, and 120D. Each of these waveguides 120A-120D may serve as either an input waveguide or as an output waveguide. For example, a light 230A may propagate through the waveguide 120A as an input light, and it may be reflected by the optical reflector structure 200 into either the waveguide 120C or the waveguide 120D as an output light 230C or 230D, respectively. Similarly, a light 230B may also propagate through the waveguide 120B as an input light and be reflected by the optical reflector structure 200 into either the waveguide 120C or the waveguide 120D as the output light 230C or 230D, respectively. On the other hand, the light 230C may propagate through the waveguide 120C as an input and be reflected by the optical reflector structure 200 into either the waveguide 120A or the waveguide 120B as the output light 230A or 230B, respectively. The light 230D may also propagate through the waveguide 120D as an input and be reflected by the optical reflector structure 200 into either the waveguide 120A or the waveguide 120B as the output light 230A or 230B, respectively. Such a MIMO structure provides further directional tuning control.

Figure 10:
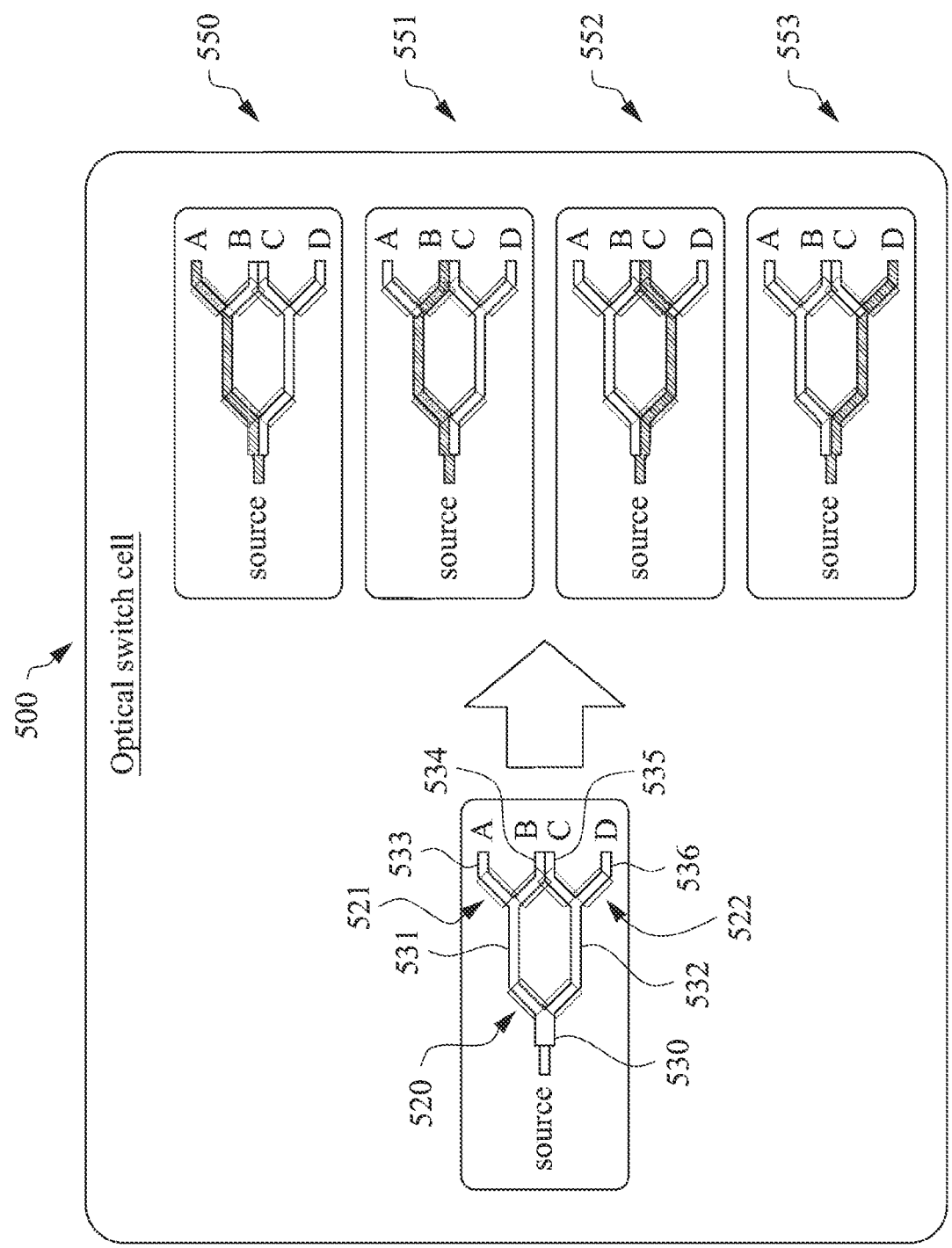
FIG. 10 illustrates an optical cell according to an embodiment of the present disclosure.

FIG. 10 is a simplified diagrammatic view of an optical switch cell 500 in which the optical reflector structure 200 discussed above may be implemented. For example, the optical switch cell 500 may include a source at which a light is generated (or received), a plurality of destinations (such as destinations A, B, C, or D) at which the light may be outputted, and optical circuitry for interconnecting the source and the destinations. The optical circuitry may include reflectors 520-522 and waveguides 530-536 in the non-limiting example of FIG. 10. The reflectors 520-522 may each be implemented as an embodiment of the optical reflector structure 200 discussed above. The waveguides 530-536 may each be implemented as one of the input waveguides or as one of the output waveguides discussed above.

Depending on how the reflectors are configured (e.g., based on electrical control signals such as voltages received from external circuitry), light may be re-directed to any one of the destinations A, B, C, or D. For example, in an optical switching scenario 550, the optical switch 520 re-directs the light received from the source via the input waveguide 530 into the output waveguide 531, and the optical switch 521 then re-directs the light received from the waveguide 531 into the destination A via the waveguide 533. In an optical switching scenario 551, the optical switch 520 re-directs the light received from the source via the input waveguide 530 into the output waveguide 531, and the optical switch 521 then re-directs the light received from the waveguide 531 into the destination B via the waveguide 534. In an optical switching scenario 552, the optical switch 520 re-directs the light received from the source via the input waveguide 530 into the output waveguide 532, and the optical switch 522 then re-directs the light received from the waveguide 532 into the destination C via the waveguide 535. In an optical switching scenario 552, the optical switch 520 re-directs the light received from the source via the input waveguide 530 into the output waveguide 532, and the optical switch 522 then re-directs the light received from the waveguide 532 into the destination D via the waveguide 536.

Note that the optical cell 500 need not have a separate set of reflectors and waveguides for each of the switching scenarios 550-553. Rather, the same underlying set of reflectors 520-522 and waveguides 530-536 may be used to tunably perform the different switching tasks, based on electrical signals received by the reflectors 520-522 from external circuitry. The flexible reconfigurability of the optical circuits using the reflectors discussed herein is one of the benefits of the present disclosure.

Figure 11A:
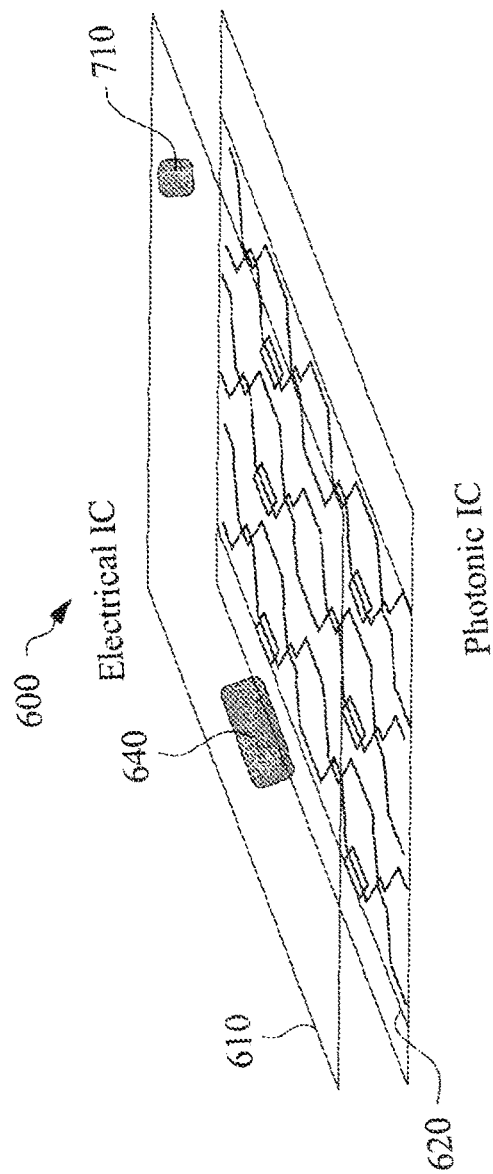
FIGS. 11A-11B illustrate systems in which optical circuits are implemented according to embodiments of the present disclosure.
Figure 11B:
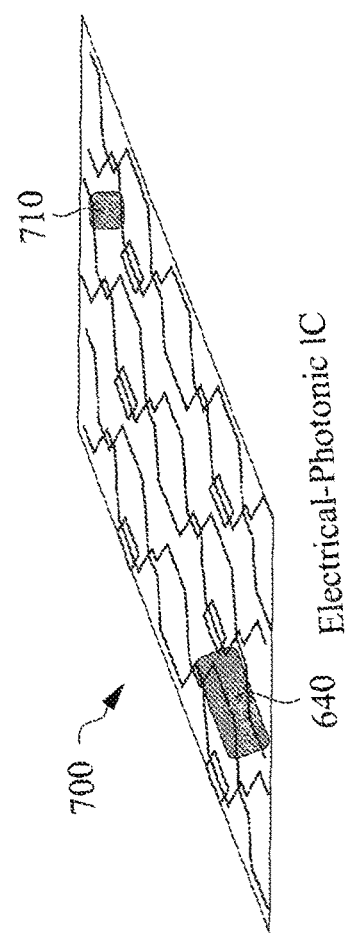

FIGS. 11A-11B illustrate example systems in which the optical reflector structure 200 discussed above may be implemented. In that regard, FIG. 11A illustrates a device 600 that includes an electrical IC 610 and a photonic IC 620 that is electrically coupled to the electrical IC 610. The electrical IC 610 contains various types of electrical circuitry, such as processors, memory cells, logic devices, transceivers, controllers, sensors, etc. Among the electrical circuitry implemented on the electrical IC 610 is a controller circuit 640. The controller circuit 640 is configured to generate the electrical signals (e.g., voltage) and send the generated electrical signals to the photonic IC 620. These electrical signals may be considered programming instructions in some embodiments. The photonic IC 620 may include waveguides and reflectors discussed above, for example, the optical reflector structure 200. Based on the received electrical signals, the optical reflector structure 200 of the photonic IC 620 may re-direct the light into one of a variety of possible light paths. Again, the re-directing of the light may be achieved nearly instantly without having to re-tape-out the photonic IC 620, since the light switches (e.g., the reflectors) of the photonic IC 620 are not hardwired to perform the light switching. In this manner, the device 600 may function similar to a field-programmable gate array (FPGA), due to the flexibility and the versatility in which the light switching performed by the photonic IC 620. As such, the device 600 may also be referred to as an optical FPGA.

FIG. 11B is similar to FIG. 11A in the sense that it also illustrates a device 700 that includes both electrical circuitry and optical circuitry. However, whereas the device 600 includes an electrical IC 610 and a photonic IC 620 that are separate from one another (though electrically coupled together), electrical circuitry and photonic circuitry are integrated together in the device 700. In other words, the device 700 may include a same chip that contains both electrical circuitry (e.g., the controller circuit 640) and photonic circuitry (e.g., the waveguides and the tunable reflectors discussed above). As such, the device 700 may also be referred to as an electrical-photonic IC 700 herein. In any case, the functionalities and/or capabilities offered by the device 700 may be substantially similar to those offered by the device 600, including but not limited to, programmably re-directing the optical paths of light.

In some embodiments, the device 600 and/or the device 700 may include a temperature sensor 710. The temperature sensor 710 may include suitable electrical circuitry configured to detect or measure a temperature of nearby regions. For example, the temperature sensor 710 may include a bandgap circuit, which is implemented based on the principle that a forward voltage of a silicon diode (e.g., associated with a base-emitter junction of a bipolar junction transistor (BJT)) is directly correlated with temperature. As such, by measuring such a forward voltage, the temperature of the silicon diode (and the temperature of nearby devices) can be sensed.

One of the benefits provided by the temperature sensor 710 is that it allows calibration to be performed before the devices 600 or 700 is put in actual operation in the field. In that regard, the temperature sensor 710 may be placed proximate to the optical reflector structure 200 discussed above, for example within a distance that is between about 0.028 microns and about 0.5 microns, to ensure that the sensor 710 can accurately measure the temperature experienced by the optical reflector structure 200. In embodiments where the optical reflector structure 200 is implemented based on the application of voltage to generate heat, the temperature sensor 710 can be used to determine how much voltage is needed to produce a given temperature (e.g., measured by the temperature sensor 710) at the optical reflector structure 200, as well as the light re-direction angle corresponding to that specific temperature. This process may be repeated for a variety of temperatures as a part of an initial calibration process that is performed before the device 600 or 700 is put in field operation.

For example, as a part of the calibration process, it may be determined that a voltage $V_1$ is needed to generate the amount of heat that heats up the reflector (or a predetermined portion thereof) to a temperature $T_1$, where the light reflection angle is $A_1$. It may also be determined that a voltage $V_2$ is needed to generate the amount of heat that heats up the reflector (or a predetermined portion thereof) to a temperature $T_2$, where the light reflection angle is $A_2$, so on and so forth. The following table provides a simplified illustration of the above calibration process:

| Voltage | Temperature | Light Reflection Angle |
|---------|-------------|------------------------|
| $V_1$   | $T_1$       | $A_1$                  |
| $V_2$   | $T_2$       | $A_2$                  |
| ...     | ...         | ...                    |
| $V_n$   | $T_n$       | $A_n$                  |

Although the above table illustrates the calibration data for one example temperature sensor 710, it is understood that a plurality of temperature sensors similar to the temperature sensor 710 may be implemented on the electrical IC 610 or on the electrical-photonic IC 700, so that the calibration process may take into account of the particular region of the respective IC in which a reflector is located. For example, a first temperature sensor may be implemented in a first corner of the electrical-photonic IC 700 to measure the temperature of a first reflector nearby, a second temperature sensor may be implemented in a second corner of the electrical-photonic IC 700 to measure the temperature of a second reflector nearby, and a third temperature sensor may be implemented in a center region of the electrical-photonic IC 700 to measure the temperature of a third reflector nearby.

It is also understood that such a calibration process may be performed at a variety of different environments. For example, a first calibration process may be performed in a cold physical environment (e.g., −25 degrees Celsius to simulate an outside temperature in a cold climate region), a second calibration process may be performed in a temperate physical environment (e.g., 25 degrees Celsius to simulate an temperature in a mild climate region or the temperature inside a building or a room), and a third calibration process may be performed in a hot physical environment (e.g., 50 degrees Celsius to simulate an outside temperature in a desert or in the heat of summer). The different environments may also take into account of other electrical equipment or devices that would be placed near the devices 600 or 700 when the devices 600 or 700 are placed in actual field operation. For example, if in field operation the devices 600 or 700 would be implemented in an electronic device (e.g., a computer server) that is placed adjacent to another electrical device that also generates a lot of heat, then the calibration process discussed above may be performed while placing the devices 600 or 700 adjacent to the other electrical device, so as to simulate how much the heat generated by the other electrical device will impact the performance of the reflectors implemented on the devices 600 or 700.

Regardless of how the calibration process is performed, it is understood that the calibration data obtained therefrom may be used to adjust the operation of the devices 600 or 700 when the devices 600 or 700 are placed in the actual field. For example, based on the calibration data, the controller circuit 640 may adjust the amount of voltage to be generated and sent to the reflectors of the photonic circuit, so that the light is still accurately re-directed to reach a targeted output path. As such, the temperature sensors 710 herein allow the calibration process to be performed, which will in turn allow the devices 600 or 700 to function more accurately.

It is understood that the various aspects of the present disclosure may apply to different types of radiation, including but not limited to: visible light, infrared light, ultraviolet light, or radiation waves having wavelengths in other spectrum ranges.

Figure 12:
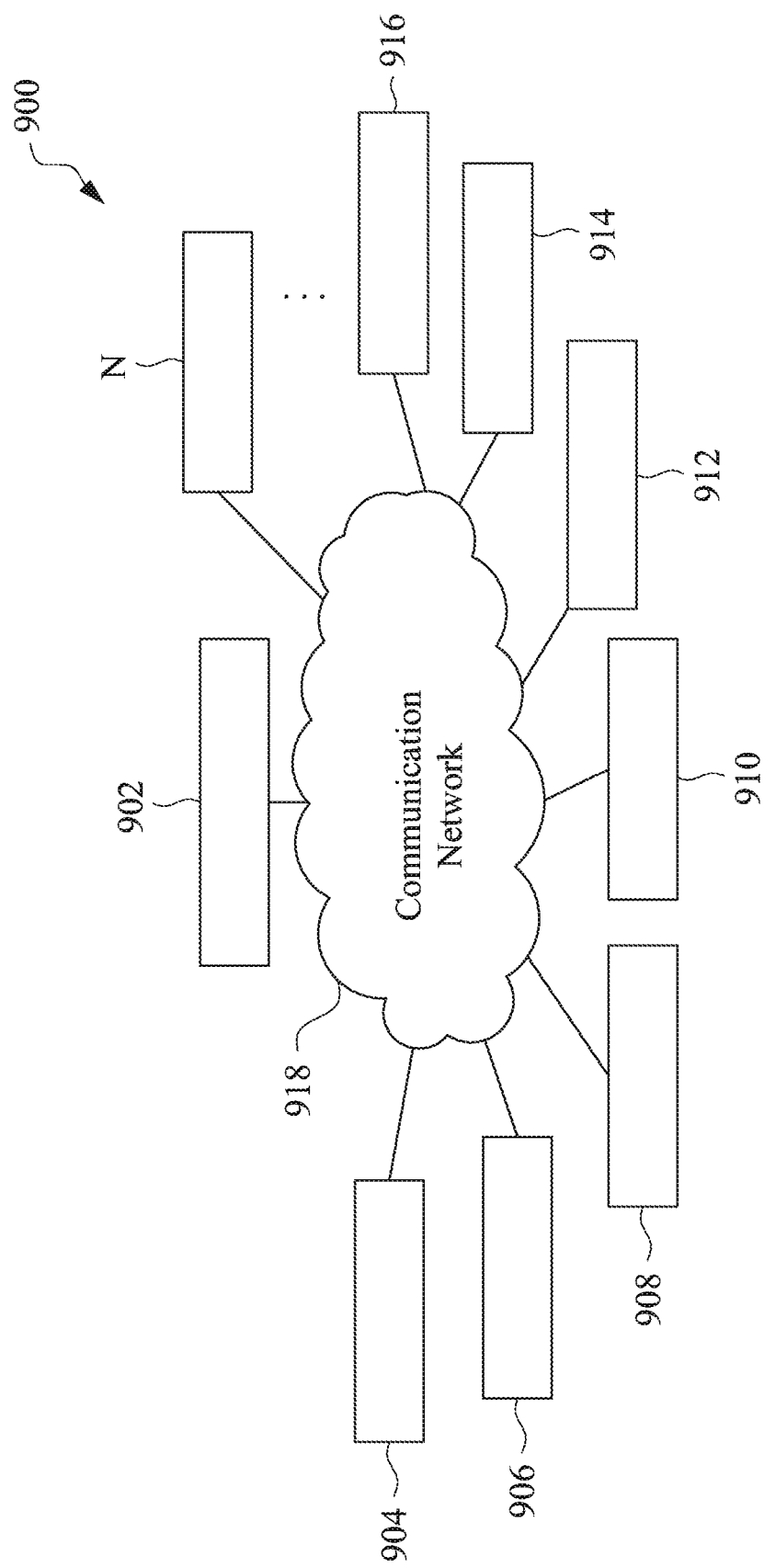
FIG. 12 illustrates a fabrication facility according to one or more aspects of the present disclosure.

FIG. 12 illustrates an integrated circuit fabrication system 900 according to embodiments of the present disclosure. The fabrication system 900 includes a plurality of entities 902, 904, 906, 908, 910, 912, 914, 916 . . . , N that are connected by a communications network 918. The network 918 may be a single network or may be a variety of different networks, such as an intranet and the Internet, and may include both wire line and wireless communication channels.

In an embodiment, the entity 902 represents a service system for manufacturing collaboration; the entity 904 represents an user, such as product engineer monitoring the interested products; the entity 906 represents an engineer, such as a processing engineer to control process and the relevant recipes, or an equipment engineer to monitor or tune the conditions and setting of the processing tools; the entity 908 represents a metrology tool for IC testing and measurement; the entity 910 represents a semiconductor processing tool, such an EUV tool; the entity 912 represents a virtual metrology module associated with the processing tool 910; the entity 914 represents an advanced processing control module associated with the processing tool 910 and additionally other processing tools; and the entity 916 represents a sampling module associated with the processing tool 910.

Each entity may interact with other entities and may provide integrated circuit fabrication, processing control, and/or calculating capability to and/or receive such capabilities from the other entities. Each entity may also include one or more computer systems for performing calculations and carrying out automations. For example, the advanced processing control module of the entity 914 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks. In some embodiments, the advanced processing control module of the entity 914 may include the control circuit 640 or circuitry operating the control circuit 640, and/or circuitry for performing the calibration process discussed above.

The integrated circuit fabrication system 900 enables interaction among the entities for the purpose of integrated circuit (IC) manufacturing, as well as the advanced processing control of the IC manufacturing. In an embodiment, the advanced processing control includes adjusting the processing conditions, settings, and/or recipes of one processing tool applicable to the relevant wafers according to the metrology results.

In another embodiment, the metrology results are measured from a subset of processed wafers according to an optimal sampling rate determined based on the process quality and/or product quality. In yet another embodiment, the metrology results are measured from chosen fields and points of the subset of processed wafers according to an optimal sampling field/point determined based on various characteristics of the process quality and/or product quality.

One of the capabilities provided by the IC fabrication system 900 may enable collaboration and information access in such areas as design, engineering, and processing, metrology, and advanced processing control. Another capability provided by the IC fabrication system 900 may integrate systems between facilities, such as between the metrology tool and the processing tool. Such integration enables facilities to coordinate their activities. For example, integrating the metrology tool and the processing tool may enable manufacturing information to be incorporated more efficiently into the fabrication process or the APC module, and may enable wafer data from the online or in site measurement with the metrology tool integrated in the associated processing tool. It is understood that the IC fabrication system 900 may be used to fabricate both the electrical IC 610 and the photonic IC 620, or the electrical-photonic IC 700 discussed above.

Figure 13:
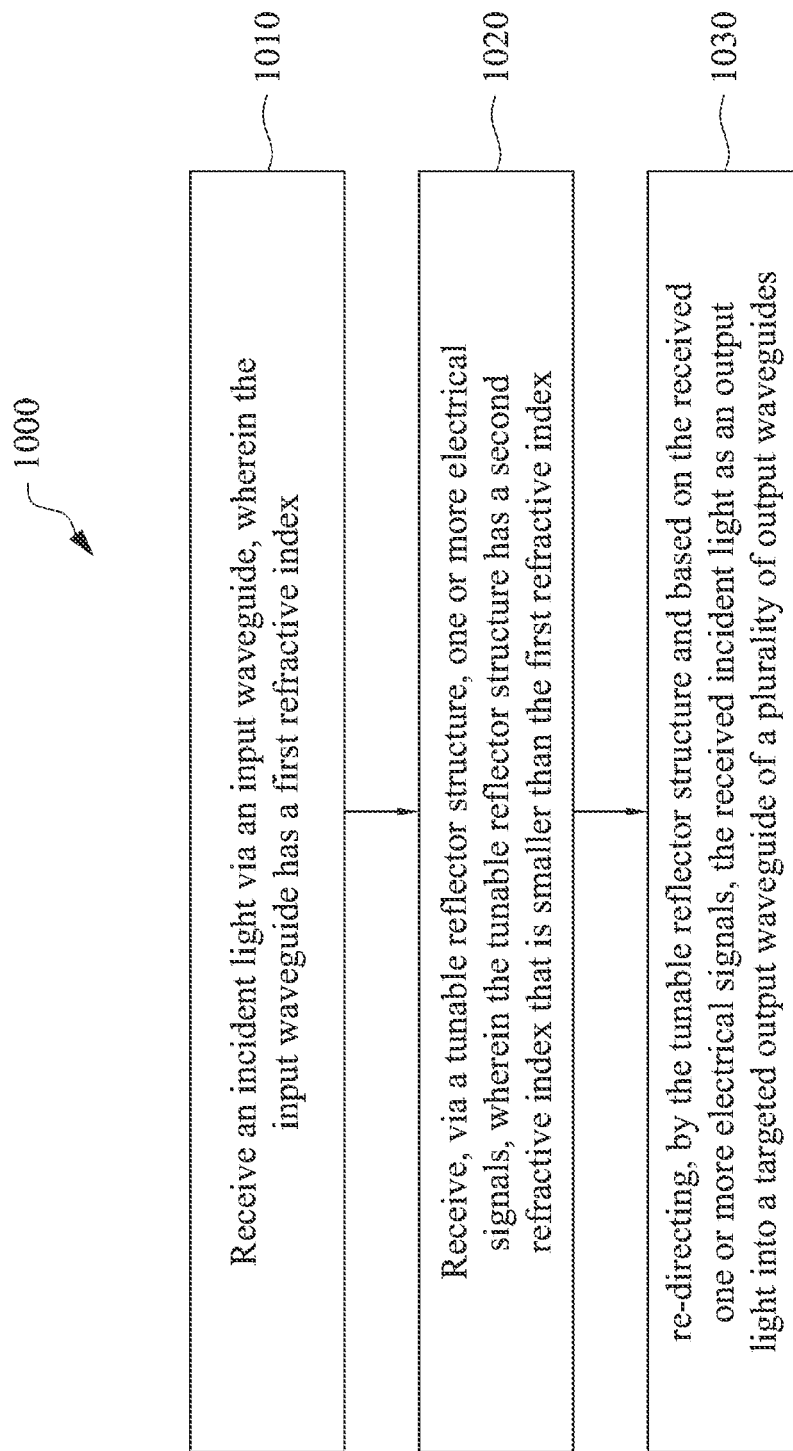
FIG. 13 illustrates a flowchart of an embodiment of a method for operating a photonic device, according to one or more aspects of the present disclosure.

FIG. 13 is a flowchart illustrating a method 1000 of operating an optical device according to embodiments of the present disclosure. The method 1000 includes a step 1010 to receive an incident light via an input waveguide. The input waveguide has a first refractive index.

The method 1000 includes a step 1020 to receive, via a tunable reflector structure, one or more electrical signals. A cladding layer of the tunable reflector structure has a second refractive index that is smaller than the first refractive index.

The method 1000 includes a step 1030 to re-direct, by the tunable reflector structure and based on the received one or more electrical signals, the received incident light as an output light into a targeted output waveguide of a plurality of output waveguides.

In some embodiments, the input waveguide, the tunable reflector structure, and the output waveguides are components of a photonic integrated circuit (IC). In some embodiments, the one or more electrical signals are generated via an electrical IC different from the photonic IC.

In some embodiments, a carrier concentration profile or a temperature profile of the input waveguide varies in response to receiving the one or more electrical signals. In some embodiments, a variation of the carrier concentration profile or a variation of the temperature profile causes the received incident light to be reflected at a different angle.

It is understood that the method 1000 may include further steps performed before, during, or after the steps 1010-1030. For example, the method 1000 may include a step of measuring, via one or more temperature sensors of the electrical IC, temperatures at different regions of the input waveguide. As another example, the method 1000 may include a step of performing, at least in part using the one or more temperature sensors, a temperature calibration for the reflector structure prior to the re-directing of the received incident light. For reasons of simplicity, other additional steps are not discussed herein in detail.

Figure 14:
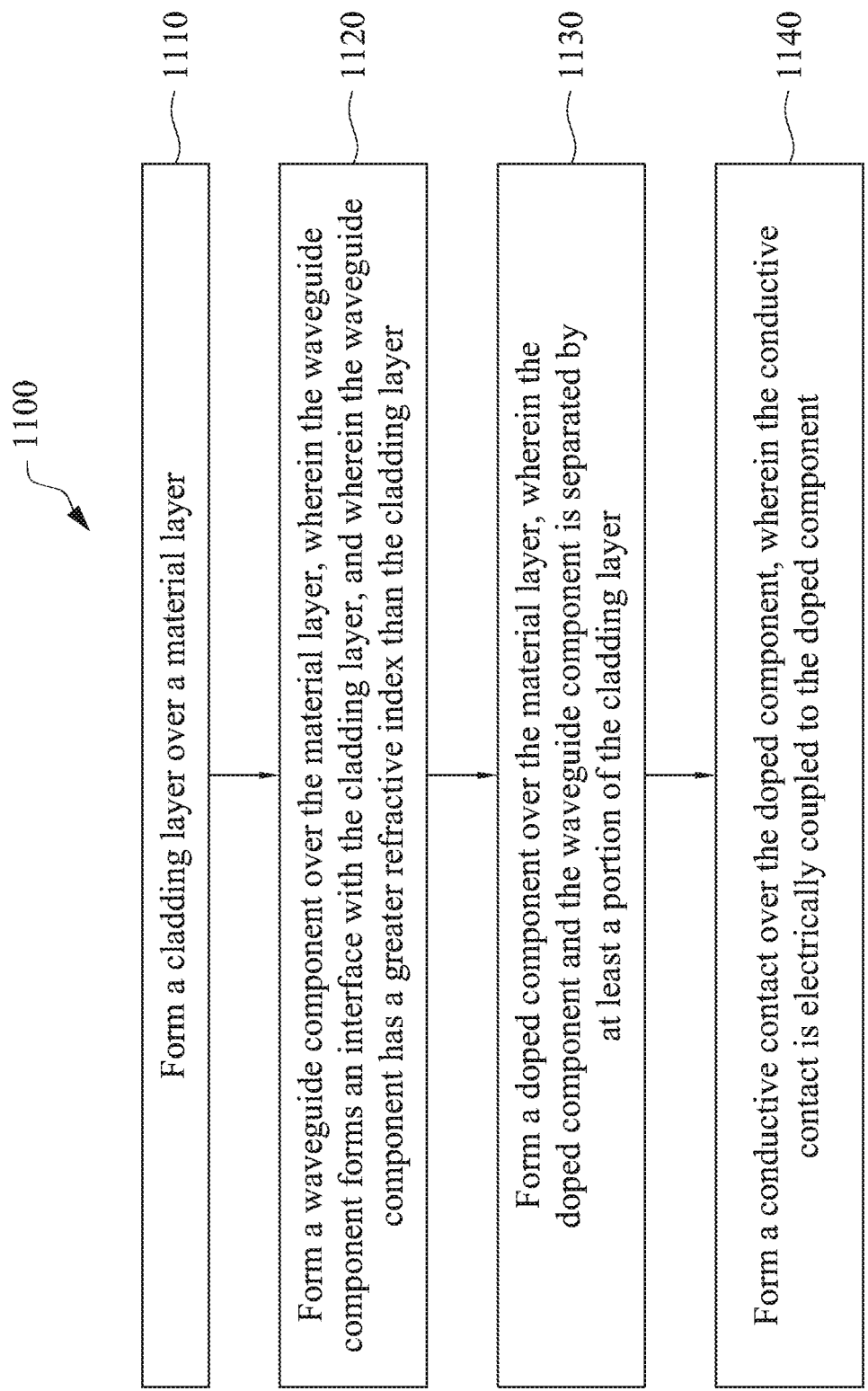
FIG. 14 illustrates a flowchart of an embodiment of a method for fabricating a photonic device, according to one or more aspects of the present disclosure.

FIG. 14 is a flowchart illustrating a method 1100 of fabricating an optical device according to embodiments of the present disclosure. The method 1100 includes a step 1110 to form a cladding layer over a material layer.

The method 1100 includes a step 1120 to form a waveguide component over the material layer. The waveguide component forms an interface with the cladding layer. The waveguide component has a greater refractive index than the cladding layer.

The method 1100 includes a step 1130 to form a doped component over the material layer. The doped component and the waveguide component is separated by at least a portion of the cladding layer.

The method 1100 includes a step 1140 to form a conductive contact over the doped component. The conductive contact is electrically coupled to the doped component.

In some embodiments, the step 1140 comprises patterning the conductive contact such that the conductive contact has a curvilinear profile in a top view.

In some embodiments, the step 1110 comprises forming silicon oxide ($SiO_2$), silicon nitride ($Si_3N_4$), silicon oxynitride (SiON), or a polymer material as the cladding layer. In some embodiments, the step 1120 comprises forming silicon, $SiO_x$, $Si_3N_4$, polyimide, polybenzoxazoles (PBO), or $SiO_xN_y$ as the waveguide component.

In some embodiments, the step 1120 comprises patterning the waveguide component such that the waveguide component defines a plurality of input paths for a light or a plurality of output paths for the light.

In some embodiments, the step 1130 comprises forming a heavily doped component that is separated from the waveguide component by at least the portion of the cladding layer.

It is understood that the method 1100 may include further steps performed before, during, or after the steps 1110-1140. For example, the method 1100 may include a step of forming a lightly doped component between the heavily doped component and the waveguide component. As another example, the method 1000 may include a step of forming one or more temperature sensors. For reasons of simplicity, other additional steps are not discussed herein in detail.

In summary, the present disclosure pertains to an improved optical reflector for switching light in a photonic device. The reflector has a cladding portion that is located directly adjacent to, and forms an interface with, an input waveguide. The reflector receives electrical signals such as voltage from an external circuit. In some embodiments, the electrical signals may cause carriers to diffuse into different portions of the input waveguide, which causes a change in different portions of the refractive index of the input waveguide. Such a change in the refractive index of the input waveguide changes the output path of the reflected light due to the Goos-Hänchen Effect. In other embodiments, the electrical signals may heat up different regions of the input waveguide differently, which again causes a change in the refractive index of the input waveguide, and that in turn changes the output path of the reflected light due to the Goos-Hänchen Effect.

The optical device discussed herein provides a variety of advantages. However, it is understood that not all advantages are discussed herein, different embodiments may offer different advantages, and that no particular advantage is required for any embodiment. One advantage is the directional tunability of the reflectors. Whereas conventional light switches may have rigid or fixed light paths, the reflectors herein may adjust the direction of its output light with much greater flexibility. For example, by configuring the specific amount of voltage applied to the reflector, the direction of the reflected light can also be adjusted. Since voltages can be incremented or decremented by relatively small steps, the direction of the reflected light can also be adjusted in relatively small angles. As such, the reflectors of the present disclosure can re-direct light in a much greater variety of output paths. Another advantage is the reconfigurability and the programmability of the optical devices herein. By working in conjunction with the controller circuit, and by performing the calibration processes prior to putting the optical devices in actual field operation, the present disclosure can achieve field programmability of the photonic circuitry, without having to re-tape-out the photonic circuits. In other words, the photonic circuits of the present disclosure may function similar to electrical FPGAs, although in a photonic switching context. Another advantage is that the optical devices herein may have reduced power consumption compared to conventional optical devices. This is because the reflectors herein do not rely on constructive interference or destructive interference to re-direct the light. As such, whereas the conventional optical switches tend to lose optical power after every stage of switching, the optical switches of the present disclosure can substantially retain all of the optical power via the principles of total reflection. In other words, optical power is still substantially preserved after every stage of optical switching. Yet a further advantage is that the reflectors of the present disclosure can achieve relatively small sizes compared to conventional optical switches. Hence, the optical IC may have a smaller device size or smaller footprint in the overall system.

One aspect of the present disclosure pertains to a device. The device includes an input waveguide, a plurality of output waveguides, and a reflector structure configured to tunably re-direct, via optical reflection, light received from the input waveguide into a targeted output waveguide of the output waveguides.

Another one aspect of the present disclosure pertains to a device. The device includes an optical circuit that includes one or more input waveguides, a plurality of output waveguides, and a reflector structure. At least a portion of the reflector structure forms an interface with the one or more input waveguides. The portion of the reflector structure has a smaller refractive index than the one or more input waveguides. The device includes an electrical circuit electrically coupled to the optical circuit. The electrical circuit generates and sends different electrical signals to the reflector structure. In response to the reflector structure receiving the different electrical signals, a carrier concentration level at or near the interface or a temperature at or near the interface changes, such that incident radiation received from the one or more input waveguides is tunably reflected by the reflector structure into a targeted output waveguide of the plurality of output waveguides.

Yet another aspect of the present disclosure pertains to a method of operating a photonic device. An incident light is received via an input waveguide. The input waveguide has a first refractive index. Via a tunable reflector structure, one or more electrical signals are received. A cladding layer of the tunable reflector structure has a second refractive index that is smaller than the first refractive index. By the tunable reflector structure and based on the received one or more electrical signals, the received incident light is re-directed as an output light into a targeted output waveguide of a plurality of output waveguides.

Yet a further aspect of the present disclosure involves a method of fabricating a photonic device. A cladding layer is formed over a material layer. A waveguide component is formed over the material layer. The waveguide component forms an interface with the cladding layer. The waveguide component has a greater refractive index than the cladding layer. A doped component is formed over the material layer. The doped component and the waveguide component is separated by at least a portion of the cladding layer. A conductive contact is formed over the doped component. The conductive contact is electrically coupled to the doped component.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
an input waveguide;
a plurality of output waveguides; and
a reflector structure configured to tunably re-direct, via optical reflection, light received from the input waveguide into a targeted output waveguide of the output waveguides, wherein the reflector structure includes one or more doped portions that include a heavily doped portion and a lightly doped portion, and wherein the lightly doped portion is located between the heavily doped portion and the output waveguides.

2. The device of claim 1, wherein:
the reflector structure includes a cladding layer bordering the input waveguide; and
the cladding layer has a lower refractive index than the input waveguide.

3. The device of claim 1, wherein the reflector structure is configured to tunably re-direct the light by injecting carriers to different regions of the input waveguide to change a reflection path of the light that is optically reflected.

4. The device of claim 3, wherein:
the reflector structure includes a plurality of electrical contacts configured to receive different voltages.

5. The device of claim 4, wherein:
the electrical contacts are implemented over the heavily doped portion.

6. The device of claim 1, wherein the reflector structure is configured to tunably re-direct the light by varying a temperature at different regions of the input waveguide to change a reflection path of the light that is optically reflected.

7. The device of claim 6, wherein the reflector structure includes a plurality of metal heaters that are configured to generate different amounts of heat in response to different voltages being applied to different ones of the metal heaters.

8. The device of claim 7, further comprising one or more temperature sensors configured to sense temperatures at different regions of the input waveguide.

9. The device of claim 1, wherein the reflector structure has a concave curvilinear shape or a convex curvilinear shape in a top view.

10. The device of claim 1, wherein:
the input waveguide is a first input waveguide;
the targeted output waveguide is a first targeted output waveguide;
the light is a first light;
the device further comprises at least a second input waveguide; and
the reflector structure is configured tunably to re-direct, via optical reflection, a second light received from the second input waveguide into a second targeted output waveguide of the output waveguides.

11. The device of claim 1, wherein:
the input waveguide, the plurality of the output waveguides, and the reflector structure are components of a photonic integrated circuit (IC); and
the device further comprises an electrical IC that contains electrical circuitry configured to generate and send electrical signals to the reflector structure to tunably re-direct the light.

12. A device, comprising:
an optical circuit that includes one or more input waveguides, a plurality of output waveguides, and a reflector structure, wherein at least a portion of the reflector structure forms an interface with the one or more input waveguides, and wherein the portion of the reflector structure has a smaller refractive index than the one or more input waveguides; and
an electrical circuit electrically coupled to the optical circuit, wherein the electrical circuit is configured to generate and send different electrical signals to the reflector structure;
wherein: in response to the reflector structure receiving the different electrical signals, incident radiation received from the one or more input waveguides is tunably reflected by the reflector structure into a targeted output waveguide of the plurality of output waveguides wherein the reflector structure includes a first doped portion and a second doped portion that is less doped than the first doped portion, and wherein the second doped portion is located between the first doped portion and the output waveguides.

13. The device of claim 12, wherein:
the different electrical signals received by the reflector structure cause carriers to be diffused from the first doped portion into the one or more input waveguides through the second doped portion, such that different regions of the one or more input waveguides have different carrier concentration levels.

14. The device of claim 13, wherein:
the reflector structure includes a plurality of metal heaters located at different regions of the reflector structure; and
the different electrical signals received by the reflector structure cause the metal heaters to generate different amounts of heat, such that different regions of the one or more input waveguides have different temperatures.

15. The device of claim 14, wherein the electrical circuit further includes one or more temperature sensors configured to measure temperatures at the different regions of the optical circuit.

16. The device of claim 12, wherein the reflector structure has a concave curvilinear shape or a convex curvilinear shape in a top view.

17. A method of fabricating a photonic device, comprising:
forming a cladding layer over a material layer;
forming a waveguide component over the material layer, wherein the waveguide component forms an interface with the cladding layer, and wherein the waveguide component has a greater refractive index than the cladding layer;
forming a doped component over the material layer, wherein the doped component and the waveguide component is separated by at least a portion of the cladding layer, and wherein the forming the doped component comprises forming a heavily doped component that is separated from the waveguide component by at least the portion of the cladding layer, and wherein the method further comprises forming a lightly doped component between the heavily doped component and the waveguide component; and
forming a conductive contact over the doped component, wherein the conductive contact is electrically coupled to the doped component.

18. The method of claim 17, wherein:
the forming the cladding layer comprises forming silicon oxide ($SiO_2$), silicon nitride ($Si_3N_4$), silicon oxynitride (SiON), or a polymer material as the cladding layer; and
the forming the waveguide component comprises forming silicon, $SiO_x$, $Si_3N_4$, polyimide, polybenzoxazoles (PBO), or $SiO_xN_y$ as the waveguide component.

19. The method of claim 17, wherein the forming the waveguide component comprises patterning the waveguide component such that the waveguide component defines a plurality of input paths for a light or a plurality of output paths for the light.

20. The method of claim 17, wherein the forming the conductive contact comprises patterning the conductive contact such that the conductive contact has a curvilinear profile in a top view.

* * * * *